US012662342B2

(12) United States Patent
Lee

(10) Patent No.: US 12,662,342 B2
(45) Date of Patent: Jun. 23, 2026

(54) REVERSE FEED AND RE-FEED OF DOCUMENT IN SCANNER

(71) Applicant: Hewlett-Packard Development Company, L.P., Spring, TX (US)

(72) Inventor: Junghoon Lee, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 28 days.

(21) Appl. No.: 18/689,976

(22) PCT Filed: Feb. 14, 2022

(86) PCT No.: PCT/US2022/016282
§ 371 (c)(1),
(2) Date: Mar. 7, 2024

(87) PCT Pub. No.: WO2023/038664
PCT Pub. Date: Mar. 16, 2023

(65) Prior Publication Data
US 2024/0383706 A1     Nov. 21, 2024

(30) Foreign Application Priority Data

Sep. 10, 2021     (KR) ........................ 10-2021-0120965

(51) Int. Cl.
*B65H 7/18*          (2006.01)
*B65H 3/06*          (2006.01)
(Continued)

(52) U.S. Cl.
CPC ............. *B65H 7/18* (2013.01); *B65H 3/0684* (2013.01); *B65H 7/12* (2013.01); *B65H 9/002* (2013.01);
(Continued)

(58) Field of Classification Search
CPC .......... B65H 7/18; B65H 3/0684; B65H 7/12; B65H 9/002; B65H 2301/331;
(Continued)

(56) References Cited

U.S. PATENT DOCUMENTS 5,278,624 A * 1/1994 Kamprath .............. B65H 9/002
271/227
6,271,307 B1 8/2001 Huff et al.
(Continued)

FOREIGN PATENT DOCUMENTS

JP          04-141258 A      5/1992
JP          11-343250 A      12/1999
(Continued)

*Primary Examiner* — Sameh Tawfik
(74) *Attorney, Agent, or Firm* — Foley & Lardner LLP

(57)          ABSTRACT

An example scanner includes a tray, a document feeding member, a document feed error detection sensor, a reading member, and a processor. The processor, in a case where a document feed error is detected by the document feed error detection sensor, is to move the tray between a first position to feed a document, and a second position deviated from the first position, and control the document feeding member to perform a reverse feeding operation of feeding an erroneous document toward the tray. Based on performing the reverse feeding operation, the processor is to move the tray between the second position and the first position and control the document feeding member to perform a re-feeding operation of feeding the erroneous document to the reading member.

20 Claims, 18 Drawing Sheets

(51) Int. Cl.
    B65H 7/12       (2006.01)
    B65H 9/00       (2006.01)
    H04N 1/00       (2006.01)

(52) U.S. Cl.
    CPC ....... H04N 1/0066 (2013.01); H04N 1/00663
        (2013.01); H04N 1/00824 (2013.01); B65H
        2301/331 (2013.01); B65H 2801/39 (2013.01)

(58) Field of Classification Search
    CPC ........ B65H 2801/39; B65H 7/10; B65H 7/20;
        B65H 7/08; B65H 5/068; B65H 5/26;
        H04N 1/0066; H04N 1/00663; H04N
        1/00824
    USPC .......................................................... 271/10
    See application file for complete search history.

(56)            References Cited

U.S. PATENT DOCUMENTS

| | | | |
|---|---|---|---|
| 9,047,726 B2 * | 6/2015 | Petermann ............. | G07D 11/16 |
| 10,209,662 B2 * | 2/2019 | Byun ................. | H04N 1/00604 |
| 10,322,898 B2 * | 6/2019 | Kogi ...................... | B65H 3/063 |
| 10,523,837 B1 | 12/2019 | Wada et al. | |
| 2006/0280111 A1 | 12/2006 | Matsumoto et al. | |

| | | | |
|---|---|---|---|
| 2007/0003344 A1 * | 1/2007 | Lee ...................... | G03G 15/602 |
| | | | 399/374 |
| 2007/0266259 A1 | 11/2007 | Utsumi | |
| 2009/0160119 A1 * | 6/2009 | Komuro .............. | B65H 3/0684 |
| | | | 271/10.01 |
| 2011/0174419 A1 | 7/2011 | Parolini et al. | |
| 2015/0076763 A1 * | 3/2015 | Katsura .................. | B65H 9/002 |
| | | | 271/265.01 |
| 2017/0057768 A1 | 3/2017 | Arima et al. | |
| 2018/0084118 A1 | 3/2018 | Tachibana | |
| 2019/0116284 A1 | 4/2019 | Yoshikaie et al. | |
| 2020/0299088 A1 | 9/2020 | Umi et al. | |

FOREIGN PATENT DOCUMENTS

| | | | |
|---|---|---|---|
| JP | 2005-138996 A | | 6/2005 |
| JP | 2007-026632 A | | 2/2007 |
| JP | 2007-328765 A | | 12/2007 |
| JP | 2011-144453 A | | 7/2011 |
| JP | 2013-098478 A | | 5/2013 |
| JP | 2013-173620 A | | 9/2013 |
| JP | 2017145119 A | * | 8/2017 |
| JP | 2020-152538 A | | 9/2020 |
| KR | 10-2017-0082311 A | | 7/2017 |
| WO | 2016/056138 A1 | | 4/2016 |

* cited by examiner

FIG. 8

REVERSE FEED AND RE-FEED OF DOCUMENT IN SCANNER

BACKGROUND

A scanner refers to a device that irradiates a document with light and receives reflected light to read an image recorded on the document. The scanner may be used alone or in combination with a printing device that prints an image on a print medium. To scan a large number of documents quickly, the scanner may include a document feeding device to draw out documents one-by-one from a tray on which a plurality of documents are loaded and to supply the document to a document feeding path on which a reading member is arranged.

BRIEF DESCRIPTION OF THE DRAWINGS

FIGS. 2 and 3 are cross-sectional views of a structure to elevate and lower a tray according to an example, wherein FIG. 2 shows a state in which the tray is located in a first position, and FIG. 3 shows a state in which the tray is located in a second position.

FIGS. 5 and 6 are side views of a structure to elevate and lower a pickup roller between a third position and a fourth position according to an example, wherein FIG. 5 shows a state in which the pickup roller is located in the third position, and FIG. 6 shows a state in which the pickup roller is located in the fourth position.

FIG. 8 is a view of a driving structure to drive a pickup roller and a feed roller according to an example.

DETAILED DESCRIPTION

Figure 1:
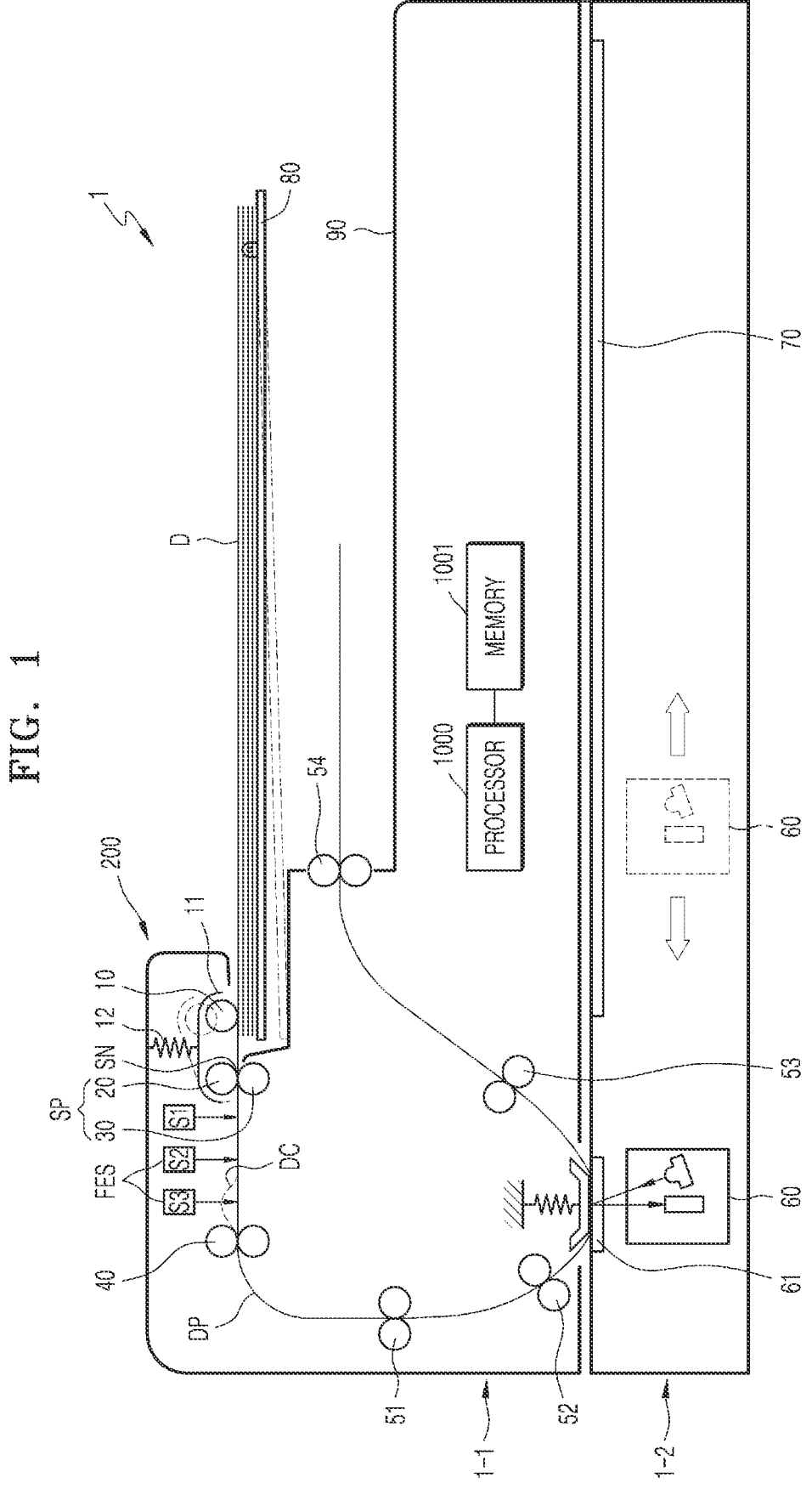
FIG. 1 is a view of a scanner according to an example.

A scanner may draw out documents one-by-one from a tray on which a plurality of documents are loaded, supply a drawn out document to a document feeding path, and read an image from the document fed along the document feeding path using a reading member arranged in the document feeding path. The image-read document may be discharged to a discharge tray. In a situation in which multiple documents are scanned, a document feed error may occur. The document feed error may include, for example, a double-feed error based on two or more documents being fed to the document feeding path, an error in which a document is not detected by an alignment sensor located on an upstream side of the document feeding path within a certain period of time, or the like.

In an example, a scanner includes a tray on which a document is loaded. The example tray is capable of ascending/descending between a first position for feeding a document and a second position deviating from the first position. The example scanner may also include a reading member to read an image from a document, a document feeding member to feed a document on the tray to the reading member, a document feed error detection sensor to detect a document feed error caused by the document feeding member, and a processor to control a document feeding process and a reading process. The document feed error detection sensor may detect a document feed error between the document feeding member and the reading member. Based on a document feed error being detected by the document feed error detection sensor, the processor may move the tray between the first position and the second position, and control the document feeding member to perform a reverse feeding operation of feeding an erroneous document toward the tray. After performing the reverse feeding operation, the processor may move the tray between the second position and the first position, and control the document feeding member to perform a re-feeding operation of feeding the erroneous document to the reading member. Thereby, an error such as a document loaded on the tray being pushed in the reverse direction by the document being fed in the reverse direction, and thus changing the order of scanning documents and the like, may be prevented. By performing the re-feeding operation for the erroneous document after the reverse feeding operation, damage to a document due to excessive feeding may be prevented.

An example document feeding member may include a pickup roller capable of ascending/descending between a third position to pick up a document on the tray, and a fourth position deviating from the third position. The processor may control the pickup roller to move to the fourth position before or during the reverse feeding operation. Thereby, a document may be more easily fed in the reverse direction. The document feed error detection sensor may include a double-feed detection sensor to sense double feeding of documents. In the case of double feed, an upper one of multiple overlapping documents may be scanned and the remaining documents may be not scanned. Based on double feeding of documents being detected by the double-feed detection sensor, the processor may identify that there is a document feed error and perform the above-described reverse feeding operation and re-feeding operation. Accordingly, missing scans of documents due to double feed may be prevented. The document feed error detection sensor may include an alignment sensor located on an upstream side of an alignment roller. Based on a document not being detected by the alignment sensor within a certain period of time after document feeding is started, the processor may identify that there is a document feed error and perform the above-described reverse feeding operation and re-feeding operation. Based on the document feed error not being resolved even after performing the reverse feeding operation and re-feeding operation up to a reference number of times, the processor may output an error message through a user interface device.

An example scanner may include a tray, a document feeding member including a pickup roller capable of ascending/descending between a third position to pick up a document on the tray and a fourth position deviating from the third position, a document feed error detection sensor, a reading member, and a processor. Based on a document feed error being detected by the document feed error detection sensor, the processor may move the pickup roller between the third position and the fourth position, and control the document feeding member to perform a reverse feeding operation of feeding an erroneous document toward the tray. After performing the reverse feeding operation, the processor may move the pickup roller from the fourth position to the third position, and control the document feeding member to perform a re-feeding operation of feeding the erroneous document to the reading member.

An example image forming apparatus may include a printing unit to print an image on a print medium and the above-described example scanner. An example printing method of the printing unit is not particularly limited. Hereinafter, examples of a scanner, an image forming apparatus, and a storage medium will be described with reference to the drawings. In the specification and drawings, the same reference numerals are used to denote the same elements, and repeated descriptions thereof will not be given herein.

FIG. 1 is a view of a scanner according to an example. Referring to FIG. 1, a scanner 1 may include a tray 80 on which a document D may be loaded, a reading member 60 to read an image from the document D, a document feeding member 200 to feed the document D on the tray 80 to the reading member 60, a document feed error detection sensor (FES) to sense a document feed error by the document feeding member 200, and a processor 1000. The tray 80 may ascend/descend between a first position (a position shown by solid lines in FIG. 1) for document feeding and a second position (a position shown by dashed lines in FIG. 1) deviating from the first position. Based on a document feed error being detected by the document feed error detection sensor FES, the processor 1000 may move the tray 80 between the first position and the second position, and control the document feeding member 200 to perform a reverse feeding operation of feeding an erroneous document toward the tray 80. After performing the reverse feeding operation, the processor may move the tray 80 between the second position and the first position, and control the document feeding member 200 to perform a re-feeding operation of feeding the erroneous document to the reading member 60. Hereinafter, a forward direction FD indicating a feed direction of the document D refers to a direction in which the document D is fed from the tray 80 toward the reading member 60, and a reverse direction RD refers to a direction in which the document D is fed toward the tray 80 away from the reading member 60. The forward direction FD may refer to a rotational direction of a rotating body in which the document D is fed from the tray 80 toward the reading member 60, and the reverse direction RD may refer to a rotational direction of the rotating body in which the document D is fed toward the tray 80 away from the reading member 60.

The reading member 60 may be installed in a document feeding path DP. The document feeding member 200 may pick up documents D from the tray 80, separate the picked-up documents D one-by-one, and feed each document D to the document feeding path DP. For example, the document feeding member 200 may include a pickup roller (e.g., a pickup member) 10 to pick up documents D from the tray 80 and a separation unit SP to separate the picked-up documents D one-by-one and feed them to the document feeding path DP. The pickup roller 10 may ascend/descend between a third position (a position shown by solid lines in FIG. 1) to pick up the document D on the tray 80 located in the first position and a fourth position (a position shown by dashed lines in FIG. 1) deviating from the third position. The separation unit SP may include a feed roller (feeding member) 20 and a retard roller 30 to engage with each other to form a nip SN. The feed roller 20 may also be referred to as an automatic document feed (ADF) roller. The retard roller 30 may also be referred to as a separation roller. The document feeding member 200 may further include a plurality of feeding members 20, for example, a feeding roller in addition to the pickup member 10, the feeding member 20, and the retard roller 30. The pickup member 10, the feeding member 20, and the retard roller 30 may be implemented in various shapes capable of feeding the document D, such as a belt, in addition to a roller. An alignment roller 40 may be located on an upstream side of the document feeding path DP. The alignment roller 40 may correct a skew of the document D. As an example, the alignment roller 40 may correct a skew of the document D between the document feeding member 200 and the reading member 60.

The processor 1000 may control a document feeding process and a reading process. The processor 1000 may include at least one central processing unit (CPU). A memory 1001 may store an application program including various instructions to control a document feeding process and a reading process, and various control factors for control. The processor 1000 may execute an application program to control a document feeding process and a reading process. Although not shown in the drawings, the processor 1000 may include a driving circuit to drive various control elements.

In an example, the scanner 1 is capable of flatbed scanning, in which the document D is located in a fixed position and an image is read while the reading member 60 is moved in a sub-scanning direction, and is capable of document feed scanning, in which an image is read from the document D fed in the sub-scanning direction using the reading member 60 located in the fixed position. The scanner 1 may include a lower unit 1-2 including a platen glass 70 on which a document for flatbed scanning may be placed, and an upper unit 1-1 to feed the document D along the document feeding path DP to perform document feed scanning. The platen glass 70 may be provided on an upper surface of the lower unit 1-2, that is, a surface opposite to the upper unit 1-1. The upper unit 1-1 may be rotated with respect to the lower unit 1-2 into an open position to open an upper portion of the platen glass 70 so that the document D can be placed on the platen glass 70, and a closed position to cover the platen glass 70. The reading member 60 may be arranged, for example, in the lower unit 1-2. The reading member 60 may include a light source to irradiate light to the document D, and a photoelectric conversion device to convert an optical signal into an electrical signal by receiving light reflected by the document D and photoelectrically converting the light. As the reading member 60, a contact type image sensor (CIS), a charge coupled device (CCD), or the like may be employed. The reading member 60 may be a one-dimensional sensor having a length in a main scanning direction. To obtain two-dimensional image data, in a case of document feed scanning, the document D may be moved along the document feeding path DP in a sub-scanning direction, and the reading member 60 may be located in a reading position opposite to a reading window 61 to read an image from the document D to obtain two-dimensional image data. In a case of flatbed scanning, two-dimensional image data may be obtained by reading an image from the document D while the document D is located on the platen glass 70 and the reading member 60 is moved in the sub-scanning direction.

The upper unit 1-1 may be provided with a document supply structure to feed the document D from the plurality of documents D loaded on the tray 80 one-by-one to the document feeding path DP. The document supply structure may include the document feeding member 200 including the pickup roller 10 and the separation unit SP including the feed roller 20 and the retard roller 30, the alignment roller 40 to correct a skew of the separated document D, and a plurality of feed rollers 51, 52, 53, and 54 to feed the document D along the document feeding path DP. The alignment roller 40 is to form a document curl DC on the upstream side, thereby correcting the skew of the document D. The feeding rollers 51 and 52 are to feed the document D to a reading area in which the reading member 60 is located along the document feeding path DP, and the feeding rollers 53 and 54 are to discharge a scanned document D to a discharge tray 90. Each of the feed rollers 51, 52, 53, and 54 may include a pair of rollers to feed the document D therebetween while being engaged with each other and rotating. One of the pair of rollers may be a driving roller, and the other may be a driven roller that is to be driven and rotated by being pressed by the driving roller.

The scanner 1 may include a plurality of sensors to sense the document D. For example, a pickup sensor S1, a double-feed detection sensor S2, and an alignment sensor S3 may be sequentially arranged on a downstream side of the separation unit SP or the nip SN with respect to a document feed direction. Based on the document D being detected by the pickup sensor S1, the processor 1000 may identify that document pickup is successful. The document feed error detection sensor FES may detect a document feed error between the document feeding member 200 and the reading member 60. For example, the document feed error detection sensor FES may include the double-feed detection sensor S2 and the alignment sensor S3. The double-feed detection sensor S2 may be, for example, an ultrasonic sensor that is to irradiate an ultrasonic wave to the document D that has passed through the separation unit SP and receive a reflected ultrasonic wave. Based on a single document D passing through the separation unit SP as compared to two or more documents D overlapping and passing through the separation unit SP, the intensity of the received ultrasonic wave may be different. The processor 1000 may identify a document feed error based on double feed being detected based on a detection signal of the double-feed detection sensor S2. The alignment sensor S3 may be arranged on an upstream side of the alignment roller 40. The alignment sensor S3 may be arranged on a downstream side of the double-feed detection sensor S2 with respect to the document feed direction. The alignment sensor S3 may be between the pickup sensor S1 and the alignment roller 40. For example, after the document D is detected by the pickup sensor S1, based on the document D not being detected by the alignment sensor S3 within a certain period of time, the processor 1000 may identify that there is a document feed error. Although not shown in the drawings, the scanner 1 may further include a tray sensor to detect whether the document D is loaded in the tray 80, a reading sensor to detect the document D from an upstream side of the reading member

60 and provide a reference of a reading start time, and a discharge sensor arranged near a feed roller 54 to detect whether the discharge of the document D has been completed. The pickup sensor S1, the alignment sensor S3, the tray sensor, the reading sensor, and the discharge sensor may include, for example, an actuator operated by the document D and a sensing unit to sense the position of the actuator. The sensing unit may be implemented by, for example, an optical sensor such as a photo interrupter, a micro switch, or the like.

The tray 80 may ascend/descend between the first position and the second position as described above. The first position may be a position close to the pickup roller 10, and the second position may be a position away from the first position, for example, retracted and apart from the pickup roller 10.

Figure 2:
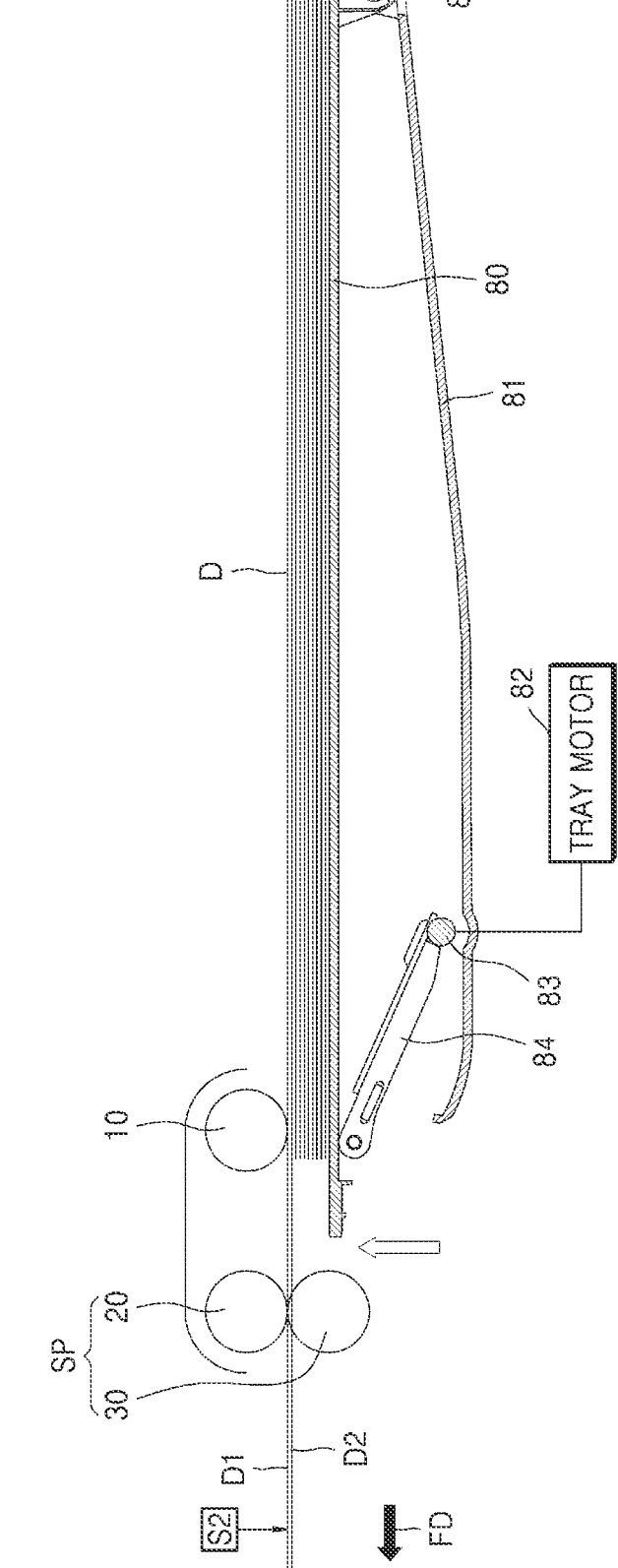
Figure 3:
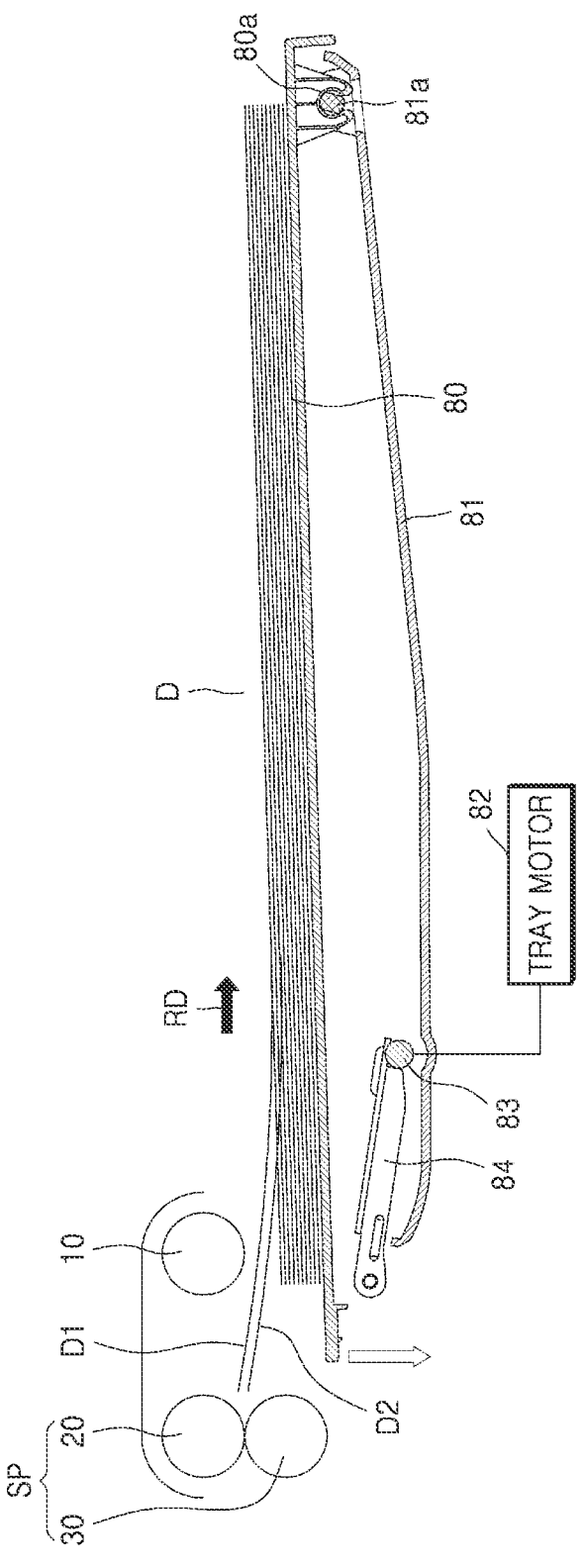

FIGS. 2 and 3 are schematic cross-sectional views of a structure to elevate and lower the tray 80 according to an example, wherein FIG. 2 shows a state in which the tray 80 is located in a first position, and FIG. 3 shows a state in which the tray 80 is located in a second position. Referring to FIGS. 2 and 3, the tray 80 is rotatably supported by a tray frame 81 to locate the tray 80 between the first position and the second position. For example, a hinge shaft 81*a* may be provided near an upstream end of the tray frame 81 with respect to a document feed direction, and a hinge hole 80*a* into which the hinge shaft 81*a* may be inserted may be provided in the tray 80. A tray drive shaft 83 may be rotatably supported near a downstream end of the tray frame 81. A lifting arm 84 may be provided on the tray drive shaft 83. According to a rotation direction of the tray drive shaft 83, the lifting arm 84 may rotate the tray 80 to the first position by pushing the tray 80. According to a rotation direction of the tray drive shaft 83, the lifting arm 84 may be apart from the tray 80 to allow the tray 80 to be rotated between the first position and the second position under its own weight. The tray drive shaft 83 may be rotated by a tray motor 82. For example, a rotational force of the tray motor 82 may be transmitted to the tray drive shaft 83 by a power transmission element not shown, for example, a gear. Although not shown in the drawings, the scanner 1 may further include a tray position detection sensor to sense the position of the tray 80. The processor 1000 may control the tray motor 82 based on a detection signal of the tray position detection sensor to move the tray 80 between the first position and the second position.

Referring to to the example of FIG. 2, the tray 80 is located in the first position. In this state, a document feeding operation of feeding the document D in the forward direction FD by the document feeding member 200 may be performed. For example, one document D1 may be fed through the separation unit SP, and a plurality of documents, for example, documents D1 and D2 may be fed through the separation unit SP. The document feed error detection sensor FES, for example, the double-feed detection sensor S2 may detect a document feed error, for example, double feed.

Based on double feed occurring, the tray 80 may be located in the second position, and an example reverse feeding operation described later below may be performed. In the state shown in FIG. 2, based on the tray motor 82 being rotated, for example, forward, the lifting arm 84 may be apart from the tray 80. The tray 80 may be rotated about the hinge shaft 81*a* by its own weight to reach the second position shown in FIG. 3. In the state shown in FIG. 3, the documents D1 and D2 doubly fed by the document feeding member 200 may be fed in the reverse direction RD by the document feeding member 200 to be located in a pickup area between the separation unit SP and the pickup roller 10.

Figure 4:
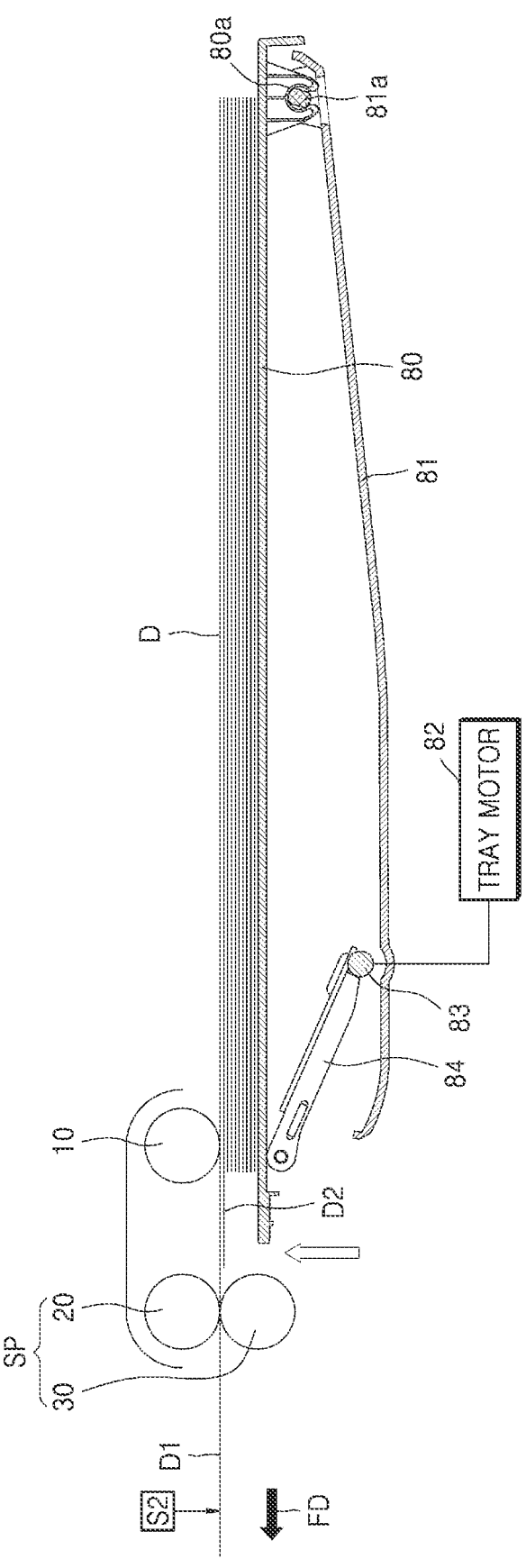
FIG. 4 is a view illustrating a state in which a re-feeding operation is performed in a state in which a tray is located in a first position according to an example.

An example re-feeding operation to be described later below may be performed in a state in which the tray 80 is returned to the first position. In the state shown in FIG. 3, for example, based on the tray motor 82 being reversely rotated, the lifting arm 84 may push the tray 80 upward, and the tray 80 may be rotated about the hinge shaft 81*a* to reach the first position as shown in FIG. 2. FIG. 4 is a view illustrating a state in which a re-feeding operation is performed in a state in which a tray is located in a first position according to an example. Referring to FIG. 4, the documents D1 and D2 reversely fed to a pickup area are fed in the forward direction FD by the document feeding member 200 in a state in which the tray 80 is located in the first position. By the re-feeding operation, the single document D1 may be fed in the forward direction FD through the separation unit SP.

Figure 5:
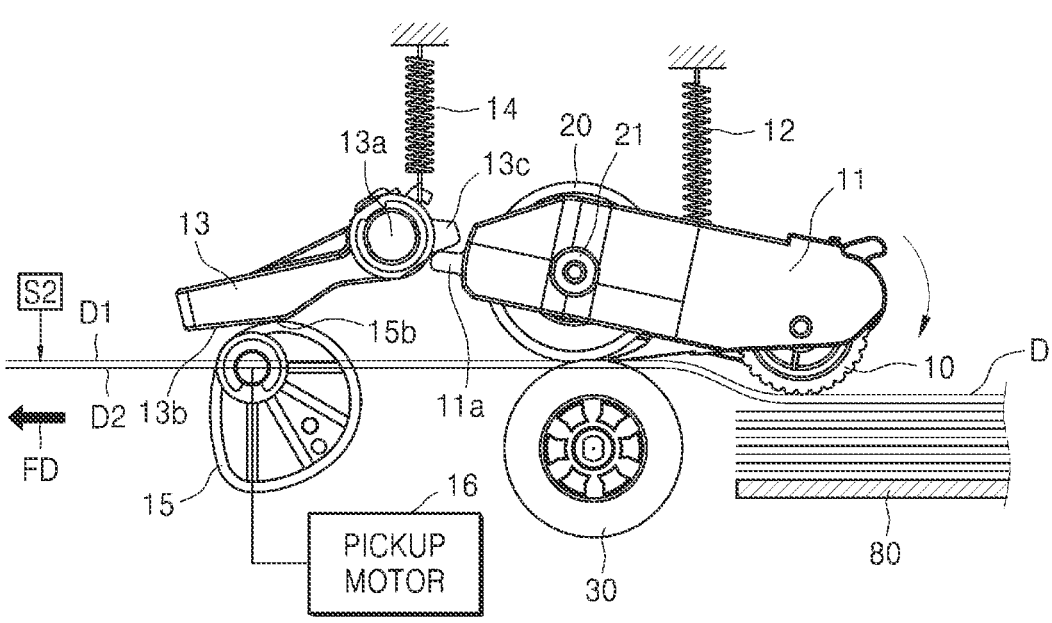
Figure 6:
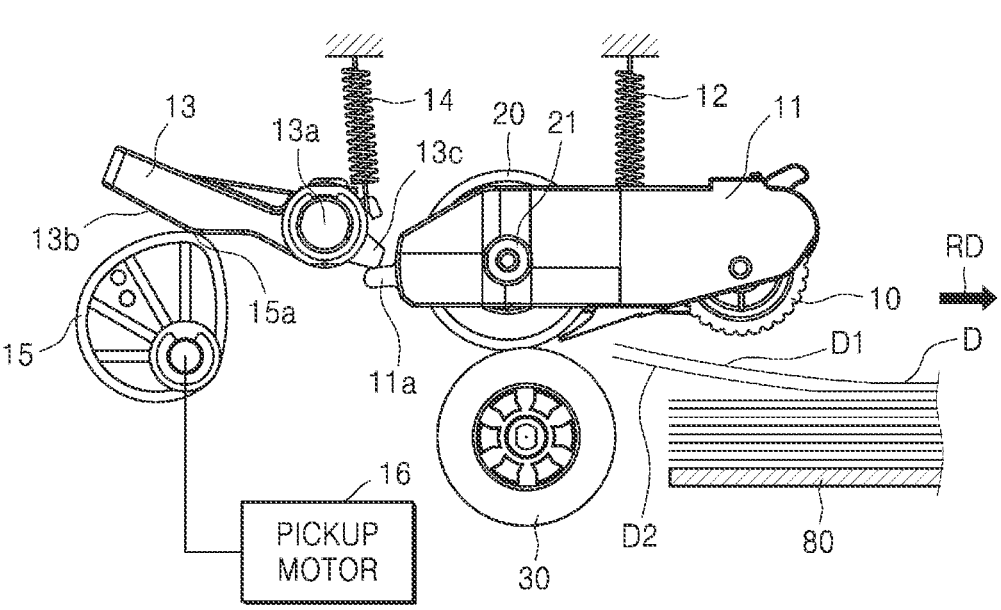

The pickup roller 10 may ascend/descend between the third and fourth positions as described in the example above. The third position may be a position in contact with the document D loaded on the tray 80 located in the first position, and the fourth position may be a position apart from the document D loaded on the tray 80 by retreating, for example, deviating from the third position. FIGS. 5 and 6 are side views of a structure to elevate and lower the pickup roller 10 between a third position and a fourth position according to an example, wherein FIG. 5 shows a state in which the pickup roller is located in the third position, and FIG. 6 shows a state in which the pickup roller is located in the fourth position. Referring to FIGS. 5 and 6, a pickup housing 11 may be rotatably supported by a rotation shaft 21 of the feed roller 20. The pickup roller 10 may be rotatably supported by the pickup housing 11. As the pickup housing 11 is rotated with respect to the rotation shaft 21 of the feed roller 20, the pickup roller 10 may ascend/descend between the third position and the fourth position. An elastic member 12 may apply an elastic force to the pickup housing 11 to rotate in a direction in which the pickup roller 10 is located in the third position. The elastic member 12 may be implemented by various types of springs, such as a compression coil spring, a leaf spring, and the like. The pickup roller 10 may be switched to the fourth position by using a pickup cam 15 that may be rotated by a pickup motor 16 and a pickup lever 13 that comes into contact with the pickup cam 15 and rotates about a shaft 13*a* according to a rotational phase of the pickup cam 15. An elastic member 14 may apply an elastic force to the pickup lever 13 to rotate in a direction in which the pickup lever 13 comes into contact with the pickup cam 15. An interference projection 11*a* may be provided on the pickup housing 11. The pickup lever 13 may interfere with the interference projection 11*a* according to the rotational phase of the pickup cam 15. Although not shown in the drawings, the scanner 1 may further include a pickup roller position detection sensor to detect the position of the pickup roller 10, for example, the position of the pickup housing 11. The processor 1000 may control the pickup motor 16 based on a detection signal of the pickup roller position detection sensor to move the pickup roller 10 between the third position and the fourth position.

Referring to FIG. 5, the pickup roller 10 may be located in the third position. In this state, a document feeding operation of feeding the document D in the forward direction FD by the document feeding member 200 may be performed. For example, one document D1 may be fed through the separation unit SP, and a plurality of documents, for example, documents D1 and D2 may be fed through the separation unit SP. The document feed error detection sensor FES, for example, the double-feed detection sensor S2 may detect a document feed error, for example, double feed.

Based on double feeding occurring, the pickup roller 10 may be located in the fourth position, and a reverse feeding operation may be performed. The pickup cam 15 may be rotated by driving the pickup motor 16 in the state shown in FIG. 5. As the pickup cam 15 is rotated, the pickup lever 13 may be rotated in a direction opposite to the elastic force of the elastic member 14 about the shaft 13*a*, and another end 13*c* of the pickup lever 13 may be in contact with the interference projection 11*a*. Based on the pickup cam 15 being further rotated, the other end 13*c* of the pickup lever 13 may press the interference projection 11*a* to rotate the pickup housing 11 in a direction opposite to the elastic force of the elastic member 12. In that case, the pickup roller 10 may be apart from the document D on the tray 80. Based on a maximum radius portion 15*a* of the pickup cam 15 coming into contact with one end 13*b* of the pickup lever 13, the pickup roller 10 may reach the fourth position as shown in FIG. 6. In the state shown in FIG. 6, the documents D1 and D2 doubly fed by the document feeding member 200 may be fed in the reverse direction RD by the document feeding member 200 to be positioned in a pickup area between the separation unit SP and the pickup roller 10.

Figure 7:
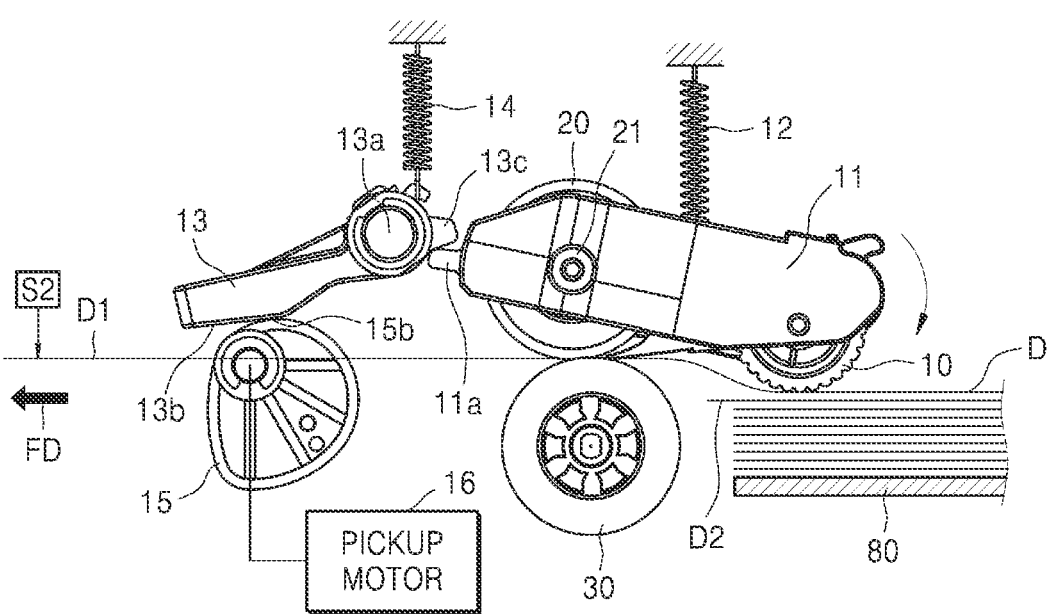
FIG. 7 is a view illustrating a state in which a re-feeding operation is performed in a state in which a pickup roller is located in a third position according to an example.

An example re-feeding operation may be performed in a state in which the pickup roller 10 is returned to the third position. As an example, in the state shown in FIG. 6, the pickup motor 16 may rotate the pickup cam 15. As the pickup cam 15 is rotated, the pickup lever 13 may be rotated about the shaft 13*a* in a direction in which the other end 13*c* of the pickup lever 13 is apart from the interference projection 11*a* of the pickup housing 11 by the elastic force of the elastic member 14. The pickup housing 11 may be rotated toward the third position about the rotation shaft 21 of the feed roller 20 by the elastic force of the elastic member 12. Based on the pickup roller 10 coming into contact with the document D on the tray 80, the pickup housing 11 may no longer be rotated. As the pickup cam 15 is rotated, the other end 13*c* of the pickup lever 13 may be apart from the interference projection 11*a* of the pickup housing 11. The pickup roller 10 may reach the third position in contact with the document D loaded on the tray 80. FIG. 7 is a view illustrating a state in which a re-feeding operation is performed in a state in which a pickup roller is located in a third position according to an example. Referring to FIG. 7, based on a minimum radius portion 15*b* of the pickup cam 15 coming into contact with one end 13*b* of the pickup lever 13, the rotation of the pickup motor 16 may stop. The other end 13*c* of the pickup lever 13 may be apart from the interference projection 11*a* of the pickup housing 11 and the documents D1 and D2, reversely fed to a pickup area, may be fed in the forward direction FD by the document feeding member 200 in a state in which the pickup roller 10 is located in the third position. By the re-feeding operation, the single document D1 may be fed in the forward direction FD through the separation unit SP. As the number of documents D loaded on the tray 80 decreases, the pickup housing 11 may be rotated toward the third position by the elastic force of the elastic member 12. Accordingly, the pickup roller 10 may be kept in contact with the document D on the tray 80.

Figure 8:
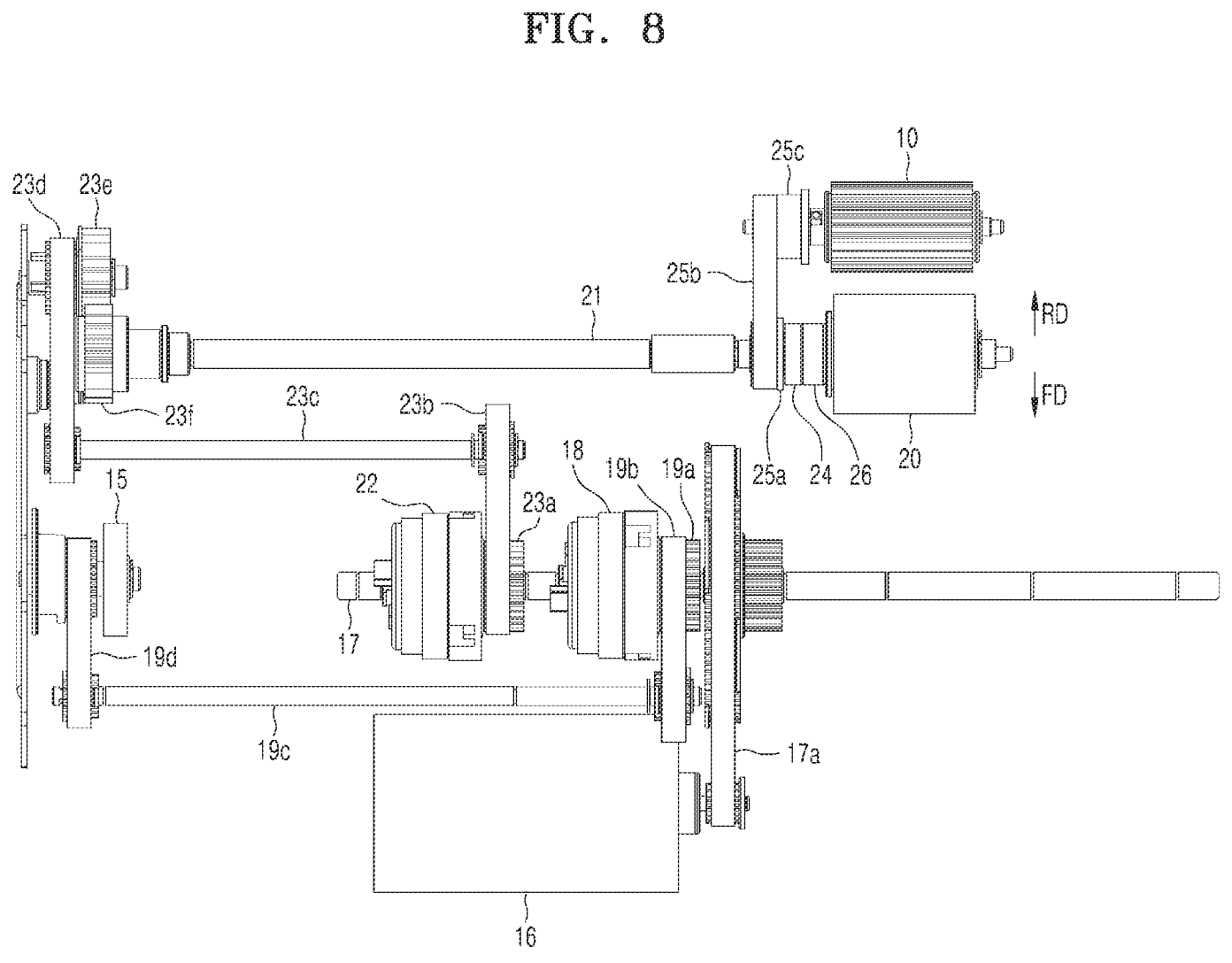

FIG. 8 is a view of a driving structure to drive the pickup roller 10 and the feed roller 20 according to an example. Referring to FIG. 8, the feed roller 20 may be driven by the pickup motor 16. As described above, the pickup motor 16 may drive the pickup cam 15 to elevate and lower the pickup roller 10 between the third and fourth positions. In order to selectively drive the feed roller 20 and the pickup cam 15, a pickup clutch 18 and an ADF clutch 22 may be provided. The pickup clutch 18 and the ADF clutch 22 may be electromagnetic clutches that can be controlled on/off by the processor 1000. The pickup clutch 18 may control a driving force of the pickup motor 16 between the pickup motor 16 and the pickup cam 15. The ADF clutch 22 may control the driving force of the pickup motor 16 between the pickup motor 16 and the feed roller 20. For example, a power transmission shaft 17 may be connected to the pickup motor 16 by a belt 17a and rotate. The pickup clutch 18 and the ADF clutch 22 may be installed on the power transmission shaft 17. The pickup clutch 18 may selectively transmit a rotational force of the power transmission shaft 17 to a pulley 19a. For example, based on the pickup clutch 18 being turned on, the pulley 19a may be rotated together with the power transmission shaft 17, and the rotational force of the power transmission shaft 17 may be transmitted to the pickup cam 15 via a belt 19b, a shaft 19c, and a belt 19d, and the pickup cam 15 may be rotated. Based on the pickup clutch 18 being turned off, even if the power transmission shaft 17 is rotated, the pulley 19a does not rotate, and the pickup cam 15 does not rotate either. The ADF clutch 22 may selectively transmit the rotational force of the power transmission shaft 17 to a pulley 23a. For example, based on the ADF clutch 22 being turned on, the pulley 23a may be rotated together with the power transmission shaft 17, and the rotational force of the power transmission shaft 17 may be transmitted to the rotation shaft 21 via a belt 23b, a shaft 23c, a belt 23d, a gear 23e, and a gear 23f, and thus, the feed roller 20 may be rotated. Based on the ADF clutch 22 being turned off, even if the power transmission shaft 17 is rotated, the pulley 23a does not rotate, and the rotation shaft 21 does not rotate either.

The feed roller 20 may be connected to the rotation shaft 21 via, for example, a one-way bearing (e.g., a first one-way bearing) 24. The one-way bearing 24 may transmit a rotational force in the forward direction FD of the rotation shaft 21 to the feed roller 20. Based on the rotation shaft 21 rotating in the forward direction FD, the feed roller 20 may rotate in the forward direction FD, and based on the rotation shaft 21 rotating in the reverse direction RD, the rotational force may not be transmitted to the feed roller 20. The pickup roller 10 may be connected to the feed roller 20 via a pulley 25a. A belt 25b may be supported by the pulley 25a and a pulley 25c of the pickup roller 10. Accordingly, the pickup roller 10 may be rotated by being driven by the feed roller 20. Optionally, a one-way bearing (e.g., a second one-way bearing) 26 may be further interposed between the rotation shaft 21 and the feed roller 20. The one-way bearing 26 may transmit the rotational force in the reverse direction RD of the rotation shaft 21 to the feed roller 20. Accordingly, based on the rotation shaft 21 being rotated in the reverse direction RD, the feed roller 20 may also be rotated in the reverse direction RD.

Figure 9:
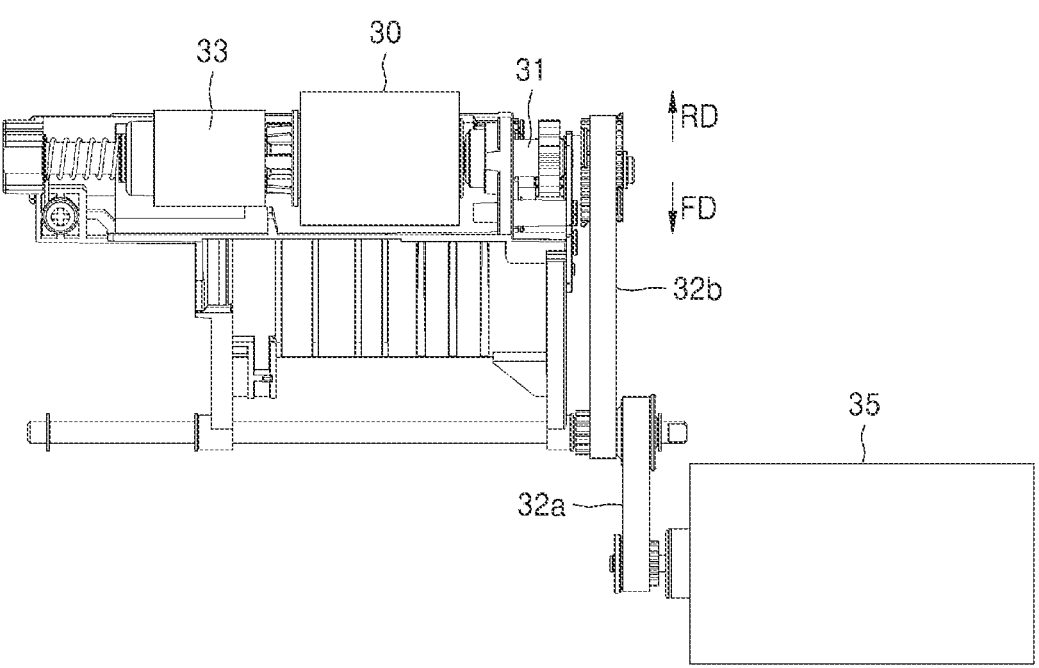
FIG. 9 is a view of a structure to drive a retard roller according to an example.

FIG. 9 is a view of a structure to drive the retard roller 30 according to an example. Referring to FIG. 9, a separation motor 35 may be connected to a rotation shaft 31 of the retard roller 30 by belts 32a and 32b. The separation motor 35 may rotate the rotation shaft 31 in the reverse direction RD. The retard roller 30 may be connected to the rotation shaft 31 via a torque limiter 33. Based on torque in the forward direction FD applied to the retard roller 30 being less than threshold torque of the torque limiter 33, the retard roller 30 rotates in the reverse direction RD. Based on the torque in the forward direction FD applied to the retard roller 30 being greater than or equal to the threshold torque of the torque limiter 33, a rotational force in the reverse direction RD of the rotation shaft 31 is not transmitted to the retard roller 30, and the retard roller 30 may be stopped or rotated in the forward direction FD.

In an example, a separation clutch (e.g., 39 of FIG. 13) for controlling a driving force of the separation motor 35 may be further provided. For example, the separation clutch 39 may be arranged in a power transmission path between the belt 32b and the rotation shaft 31. The separation clutch 39 may be, for example, an electromagnetic clutch that can be controlled on/off by the processor 1000. The separation motor 35 for driving the retard roller 30 may be omitted. In this case, the retard roller 30 may be a roller that is driven by the feed roller 20 or stopped according to the number of the documents D that have entered the nip SN. For example, based on a single document D entering the nip SN, the retard roller 30 may be driven by the feed roller 20. Based on two or more documents D entering the nip SN, the retard roller 30 may not be rotated and may be stopped.

Figure 10:
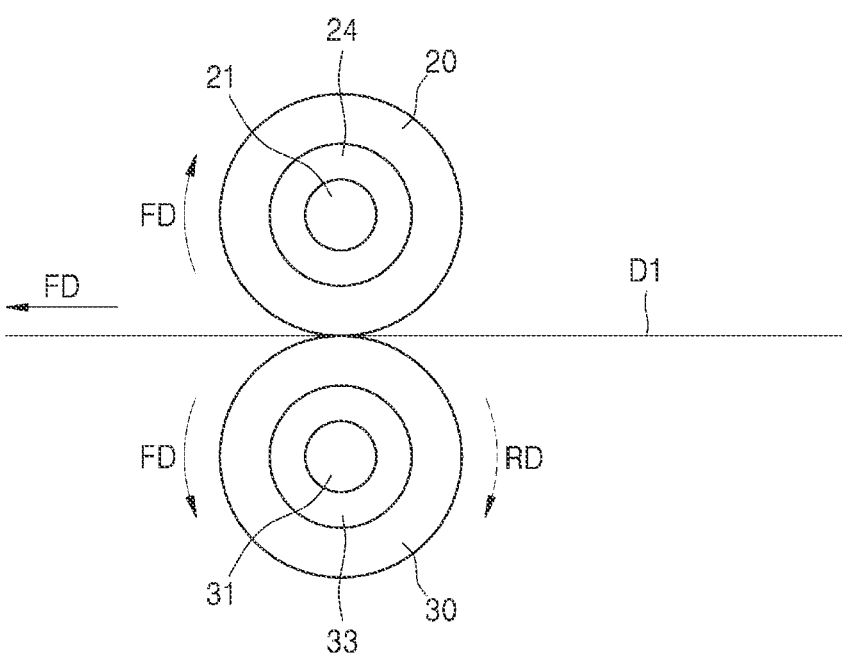
FIGS. 10 and 11 are views illustrating a separation operation of a separation unit according to an example.
Figure 11:
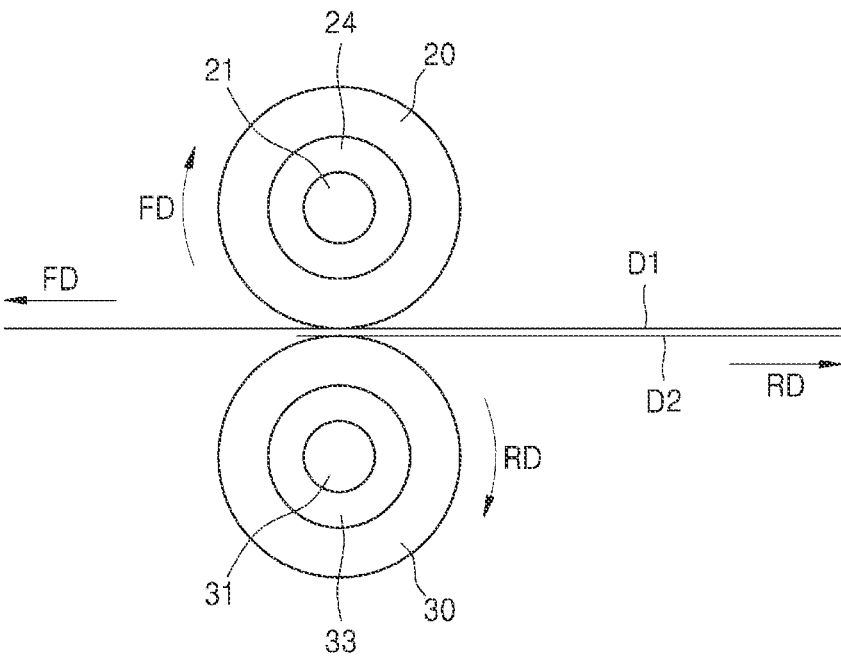

FIGS. 10 and 11 are views illustrating a separation operation of the separation unit SP according to an example. Referring to FIG. 10, the feed roller 20 and the retard roller 30 may engage with each other to form the nip SN. The pickup motor 16 may rotate the rotation shaft 21 in the forward direction FD. A rotational force of the rotation shaft 21 may be transmitted to the feed roller 20 by the one-way bearing 24 so that the feed roller 20 may be rotated in the forward direction FD. The pickup roller 10 may pick up the document D from the tray 80 while rotating in the forward direction FD together with the feed roller 20 to enter the nip SN. The separation motor 35 may rotate the rotation shaft 31 in the reverse direction RD. Based on a single document D1 entering the nip SN, the torque in the forward direction FD applied to the retard roller 30 by the document D1 fed in the forward direction FD by the feed roller 20 may be greater than the threshold torque of the torque limiter 33. A rotational force in the reverse direction RD of the rotation shaft 31 may not be transmitted to the retard roller 30. The retard roller 30 may be driven by the feed roller 20 and rotate in the forward direction FD. The document D1 may be fed in the forward direction FD and supplied to the document feeding path DP. Based on a single document D1 entering the nip SN, even in a structure in which the separation motor 35 is omitted, the retard roller 30 may be driven by the feed roller 20 and rotate in the forward direction FD.

Referring to FIG. 11, based on two documents D1 and D2 entering the nip SN, a friction force between the two documents D1 and D2 may be less than a friction force between the document D1 and the feed roller 20 and a friction force between the document D2 and the retard roller 30. The torque in the forward direction FD applied to the retard roller 30 by the friction force between the documents D1 and D2 may be less than the threshold torque of the torque limiter 33. A rotational force in the reverse direction RD of the rotation shaft 31 may be transmitted to the retard roller 30 so that the retard roller 30 is rotated in the reverse direction RD. The document D1 may be fed in the forward direction FD by the feed roller 20, and the document D2 may be fed in the reverse direction RD by the retard roller 30. Based on a front end of the document D2 being separated from the nip SN, as described in FIG. 10, the retard roller 30 may be driven by the feed roller 20 and rotate in the forward direction FD, and the document D1 may be fed in the forward direction FD and supplied to the document feeding path DP. In an example structure in which the separation motor 35 is omitted, the retard roller 30 may not rotate. Accordingly, the document D2 may be stopped without being fed, and as the feed roller 20 rotates in the forward direction FD, the document D1 may be fed in the forward direction FD.

Figure 12:
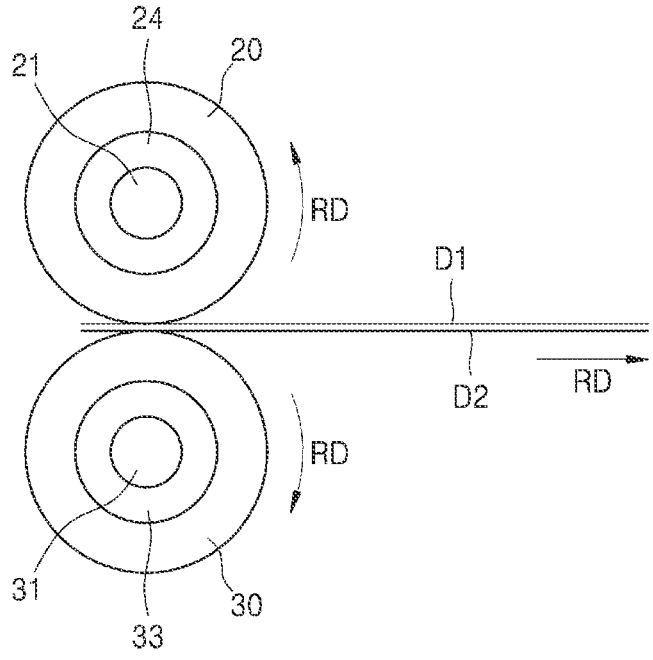
FIG. 12 is a view illustrating a reverse feeding operation performed by a separation unit according to an example.

FIG. 12 is a view illustrating a reverse feeding operation performed by the separation unit SP according to an example. For example, based on detecting that the two documents D1 and D2 have passed through the separation unit SP by the double-feed detection sensor S2, a reverse feeding operation may be performed. The reverse feeding operation may be performed by rotation of at least one of the feed roller 20 or the retard roller 30 in the reverse direction RD. Accordingly, as shown in FIG. 12, the doubly-fed documents D1 and D2 may be fed in the reverse direction RD.

Figure 13:
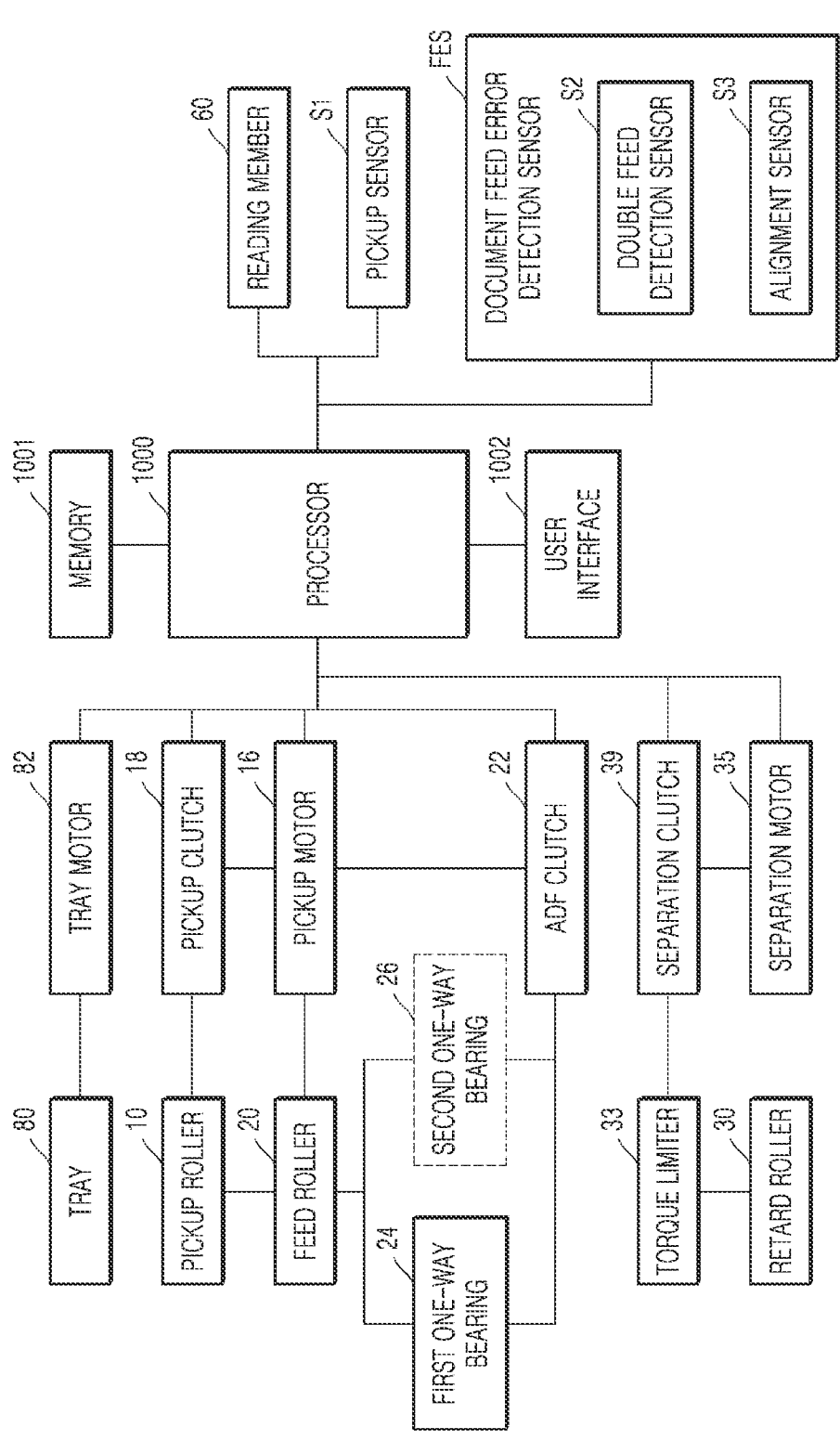
FIG. 13 is a block diagram of a scanner according to an example.
Figure 14:
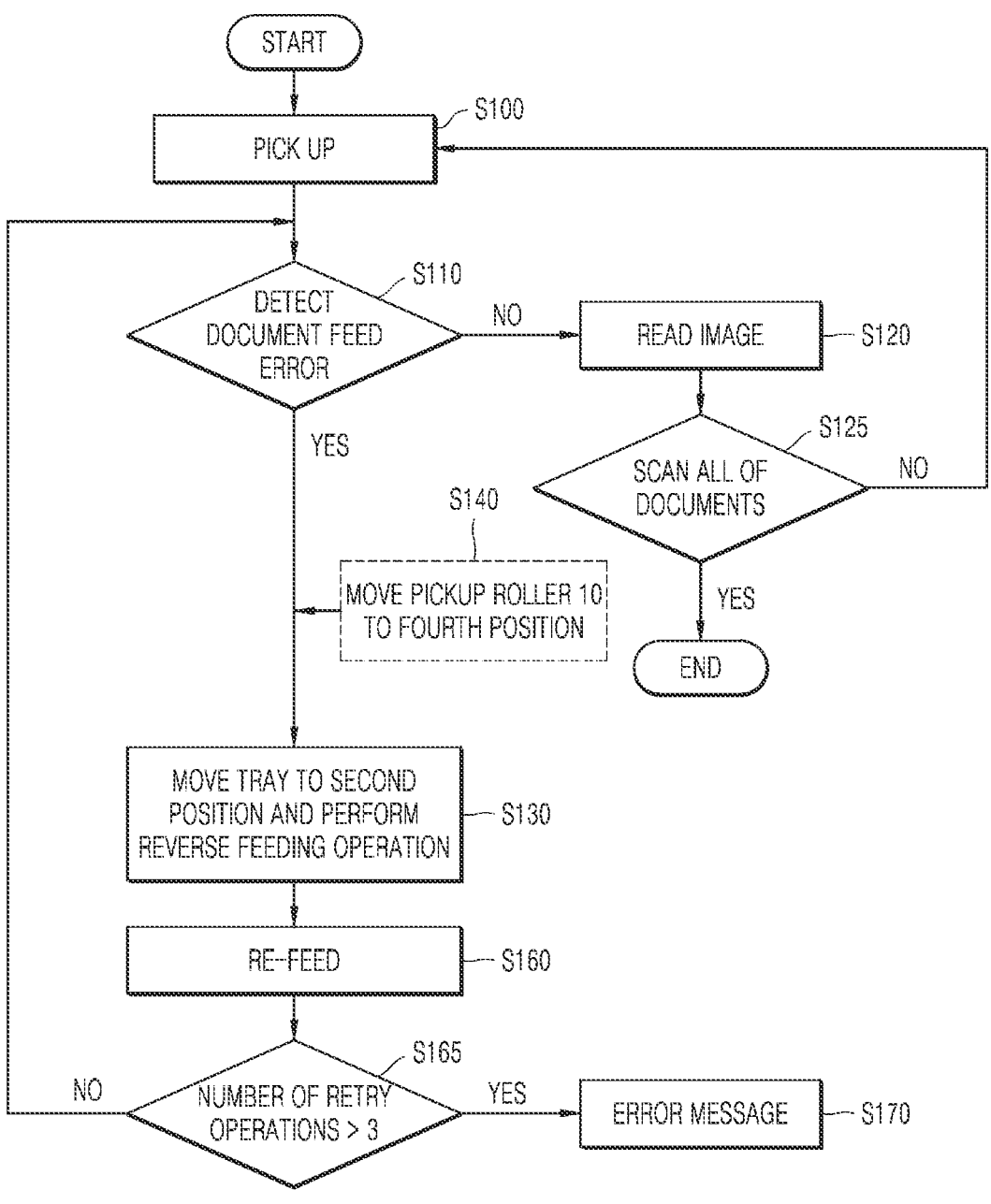
FIG. 14 is a flowchart illustrating a scanning method according to an example.

FIG. 13 is a block diagram of the scanner 1 according to an example. FIG. 14 is a flowchart illustrating a scanning method according to an example. FIGS. 15 to 20 are views illustrating a scanning process according to an example. Hereinafter, an example of a scanning method will be described with reference to FIGS. 1 to 20. In order to perform the reverse feeding and re-feeding operations described later below, as described in FIGS. 8 and 9, the scanner 1 may have a structure in which at least the feed roller 20 is rotatable in the forward direction FD and the reverse direction RD, a structure in which the retard roller 30 is rotatable in the reverse direction RD, or a structure in which the feed roller 20 is rotatable in the forward direction FD and the reverse direction RD and the retard roller 30 is rotatable in the reverse direction RD.

Figure 15:
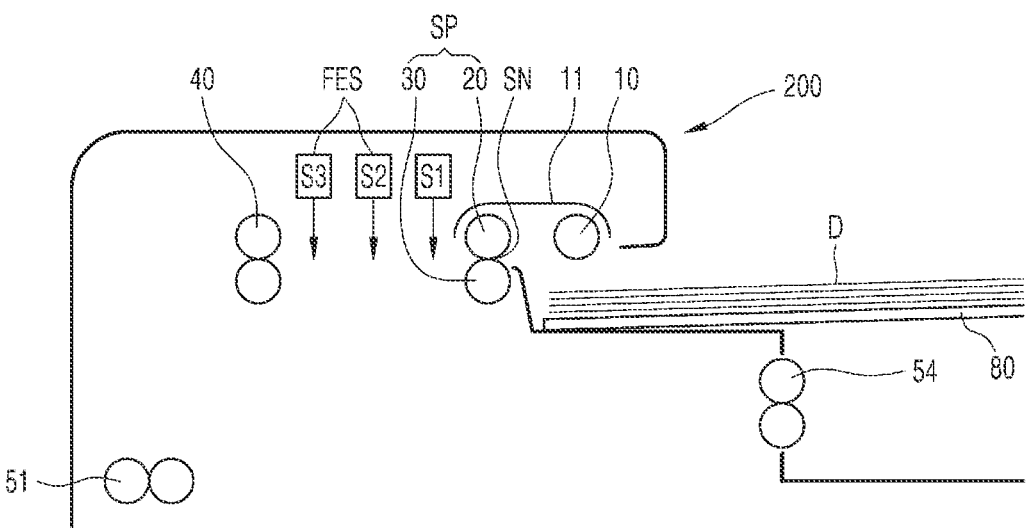
FIGS. 15 to 20 are views illustrating a scanning process according to an example.

Referring to FIG. 15, the tray 80 may be located in the second position. The pickup roller 10 may be located in the third position. The document D may be loaded on the tray 80. Based on a scan start command being input from a user interface 1002 or a host (not shown), the processor 1000 may start a scanning operation. The user interface 1002 may include an output device and an input device. The output device may include, for example, a visual display device such as a display unit and an audible display device such as a beeper, a speaker, or the like. The input device may include, for example, a physical button or the like. A touch screen display in which the output device and the input device are integrated may be employed as the user interface device 1002.

Figure 16:
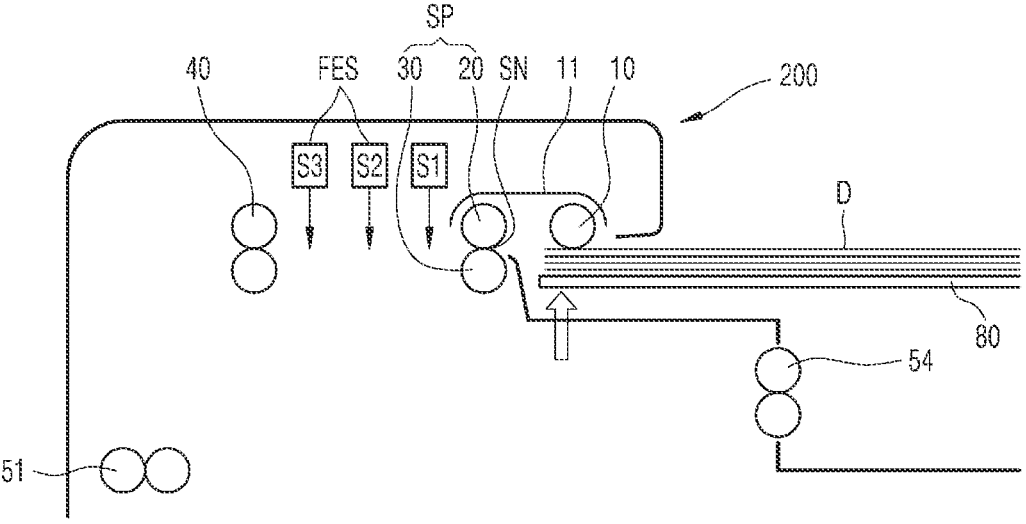

In operation S100, the document D on the tray 80 may be picked-up. Pick-up operation S100 may include moving the tray 80 between the second position and the first position and picking up the documents D from the tray 80 using the document feeding member 200 and separating the documents D one-by-one. For example, the processor 1000 may reversely rotate the tray motor 82 to push the tray 80 upward with the lifting arm 84 to rotate the tray 80 to the first position as shown in FIGS. 2 and 16. Based on detecting that the tray 80 has reached the first position from a detection signal of a not-shown tray position detection sensor, the processor 1000 may stop the tray motor 82. The processor 1000 may turn on the ADF clutch 22. The processor 1000 may rotate the pickup motor 16 forward to rotate the pickup roller 10 and the feed roller 20 in the forward direction FD. Based on the separation motor 35 being installed, the processor 1000 may turn on the separation clutch 39 and rotate the separation motor 35 to rotate the retard roller 30 in the reverse direction. The document D may be picked up from the tray 80 by the pickup roller 10 and enter the nip SN.

As described in FIG. 10, based on a single document D1 entering the nip SN, as the feed roller 20 is rotated in the forward direction FD, the retard roller 30 is also driven in the forward direction FD, and the document D1 may be supplied to the document feeding path DP. As described in FIG. 11, based on a plurality of documents D, for example, two documents D1 and D2 entering the nip SN, the retard roller 30 may rotate in the reverse direction RD, and thus, the document D2 may be fed in the reverse direction RD, and the document D1 may be fed in the forward direction FD and supplied to the document feeding path DP.

Figure 17:
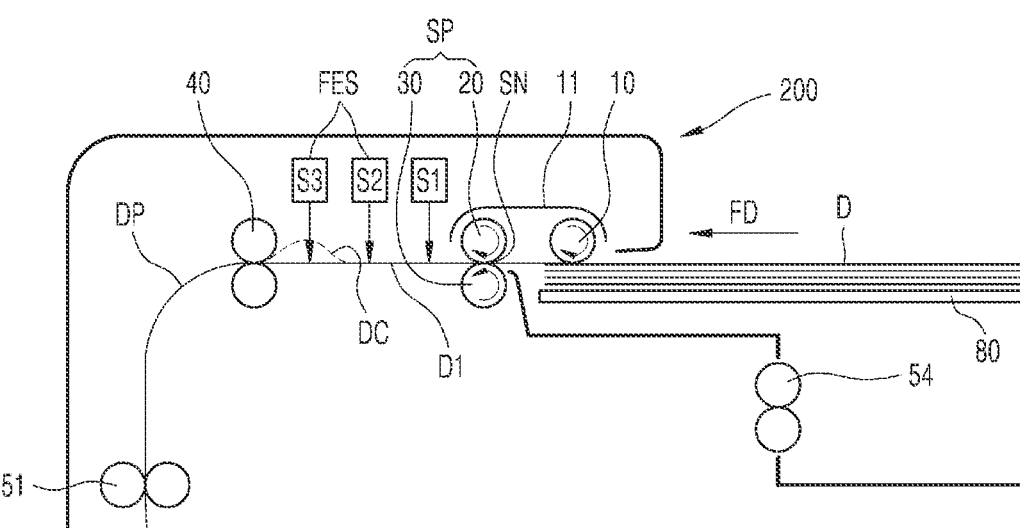

As shown in FIG. 17, based on the document D1 being detected by the pickup sensor S1, the processor 1000 may identify that the pickup is successful. In operation S110, the processor 1000 may detect a document feed error based on a detection signal of the document feed error detection sensor FES. Based on a document feed error not occurring, the document D1 may be fed to the reading member 60 through a skew correction process by the alignment roller 40. In operation S120, the processor 1000 may read an image from the document D1 using the reading member 60. The document D1 that has been read may be discharged to the discharge tray 90. Until operation S125 of detecting that all of the documents D loaded on the tray 80 have been scanned, operation S100 of picking up, operation S110 of detecting a document feed error, and operation S120 of reading are performed.

Based on a document feed error being detected by the document feed error detection sensor FES, for example, based on two or more documents D being fed through the nip SN, the processor 1000 may detect, in operation S110, that a document feed error due to the double feed has occurred based on the detection signal of the double-feed detection sensor S2. After starting document feed, for example, based on the document D not being detected by the alignment sensor S3 even after a certain period of time elapses after the document D is detected by the pickup sensor S1, the processor 1000 may identify that a document feed error has occurred. The certain period of time may be stored in advance in the memory 1001 considering, for example, a document feed rate by the feed roller 20 and a distance between the pickup sensor S1 and the alignment sensor S2.

Figure 18:
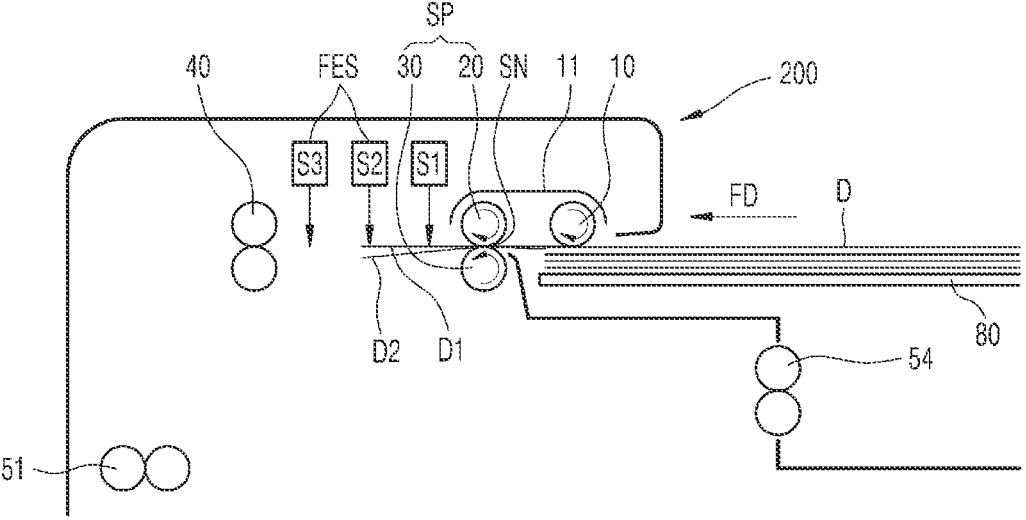

Based on double feed occurring, for example, based on the document D1 and the document D2 passing through the nip SN as shown in FIG. 18, information about the document D1 may be read by the reading member 60, and information about the document D2 may not be read. Accordingly, the information about the document D2 may be omitted. In this case, based on a user not recognizing the double feed, scan information may be omitted. In addition, based on a user recognizing the double feed, the missing document D2 may be found and scanned again, or the entire document may be scanned again. The document feed error detected by the alignment sensor S3 may be due to, for example, slip of the document D. In this case, based on the scan being stopped, a user may reload an erroneous document D in the tray 80 and perform scanning, or scan the entire document D again.

According to an example scanning method, based on a document feed error being detected, a document feeding retry operation may be performed. The document feeding retry operation may include operation S130 of moving the tray 80 between the first position and the second position and performing a reverse feeding operation of feeding the erroneous document D in the reverse direction RD, and operation S160 of performing a re-feeding operation of moving the tray 80 to the first position after performing the reverse feeding operation and feeding the erroneous document D back to the document feeding path DP.

According to an example scanning method, the tray 80 may be moved to the second position, and erroneous documents D1 and D2 may be reversely fed. Because the tray 80 may be moved in a direction away from the pickup roller 10 and may be located in the second position, a distance between the tray 80 and the pickup roller 10 may be increased, and thus, pushing of the documents D on the tray 80 by the documents D1 and D2 being fed in the reverse direction RD and the disruption of front end alignment due to this may be prevented. An example scanning method may further include operation S140 of moving the pickup roller 10 to the fourth position before or during a reverse feeding operation. Because the pickup roller 10 may be moved in a direction away from the tray 80 and may be located in the fourth position, the distance between the tray 80 and the pickup roller 10 may be increased, and thus, pushing of the documents D on the tray 80 by the document D1 being fed in the reverse direction RD and the disruption of front end alignment due to this may be prevented. Hereinafter, operations S130, S140, and S160 will be sequentially described with respect to a case in which double feed occurs. In the case of a document feed error detected by the alignment sensor S3, reverse feeding and re-feeding operations may be performed in the same manner.

Figure 19:
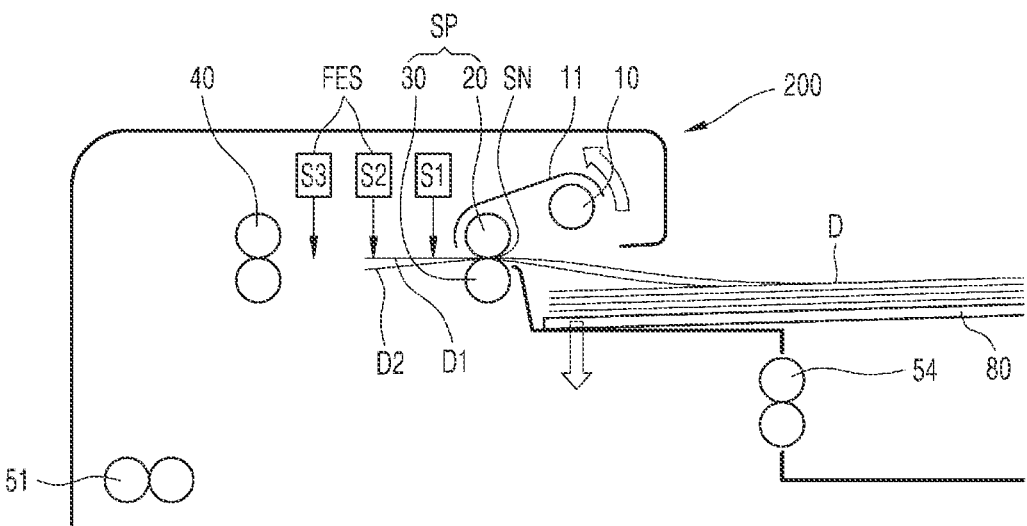

As shown in FIG. 18, based on double feed being detected by the double-feed detection sensor S2 after the two documents D1 and D2 pass through the nip SN, the processor 1000 may stop feeding the document. For convenience of description, in FIG. 18, the documents D1 and D2 are shown in a state of being exaggeratedly apart from each other. The processor 1000 may stop the pickup motor 16 and the separation motor 35. The processor 1000 may move the tray 80 between the first position and the second position. The processor 1000 may rotate the tray motor 82 forward. The lifting arm 84 may be rotated in a direction away from the tray 80, and the tray 80 may be lowered by its own weight and moved to the second position as shown in FIGS. 3 and 19.

After the operation of moving the tray 80 to the second position (e.g., a first evacuation operation) is performed, together with the first evacuation operation, before the first evacuation operation is performed, or while the reverse feeding operation to be described later below is being performed, the processor 1000 may further perform an operation of moving the pickup roller 10 to the fourth position (e.g., a second evacuation operation). The processor 1000 may turn on the pickup clutch 18 and rotate the pickup motor 16 forward. While the pickup cam 15 is rotated, the pickup lever 13 may be rotated to press the interference projection 11*a* of the pickup housing 11. The pickup housing 11 may be rotated in a direction in which the pickup roller 10 moves away from the tray 80. As shown in FIGS. 7 and 19, based on the pickup roller 10 reaching the fourth position, the processor 1000 may turn off the pickup clutch 18 and stop the pickup motor 16.

The processor 1000 may perform a reverse feeding operation in which a picked-up document D, that is, the erroneous documents D1 and D2 are fed in the reverse direction RD by using the document feeding member 200 to locate front ends of the documents D1 and D2 in a pickup area, for example, between the nip SN and the pickup roller 10. The reverse feeding operation may be performed by rotating the retard roller 30 in the reverse direction RD and allowing the feed roller 20 to be driven by the retard roller 30, rotating the feed roller 20 and the retard roller 30 in the reverse direction RD, or rotating the feed roller 20 in the reverse direction RD and allowing the retard roller 30 to be driven by the feed roller 20. As described above, the pickup roller 10 may be driven by the feed roller 20.

Figure 20:
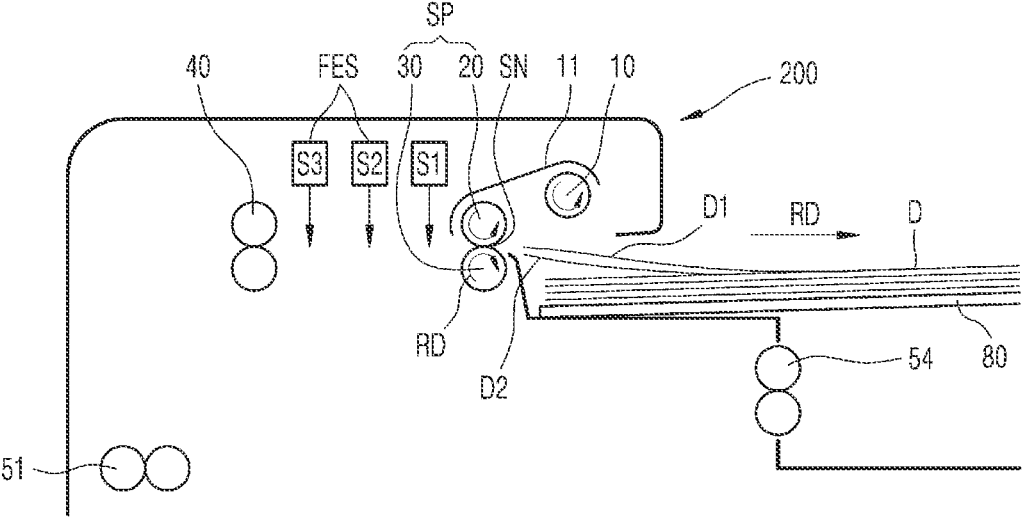

The reverse feeding operation may be performed by rotating the retard roller 30 in the reverse direction RD and allowing the feed roller 20 to be driven by the retard roller 30. In the state shown in FIG. 19, the processor 1000 may turn on the separation clutch 39 and rotate the separation motor 35 to rotate the retard roller 30 in the reverse direction RD. The processor 1000 may turn off the ADF clutch 22 so that the feed roller 20 can be driven by the retard roller 30 and rotated in the reverse direction RD. The pickup roller 10 may be driven by the feed roller 20. The documents D1 and D2 caught in the nip SN may be fed in the reverse direction RD by the retard roller 30. The documents D1 and D2 may be fed simultaneously or sequentially in the reverse direction RD. As shown in FIG. 20, based on the front ends of the documents D1 and D2 being out of the nip SN, the documents D1 and D2 are no longer fed in the reverse direction RD.

Due to the inertia, the front ends of the documents D1 and D2 may be fed from the nip SN to a position slightly apart from the nip SN in the reverse direction RD. Based on the front ends of the documents D1 and D2 reaching a pickup area between the nip SN and the pickup roller 10, the processor 1000 may turn off the separation clutch 39 and stop the separation motor 35. The processor 1000 may turn off the separation clutch 39 and stop the separation motor 35 after a certain period of time elapses from a point in time at which the documents D1 and D2 are not detected by, for example, the pickup sensor S1. The certain period of time may be a time during which a front end of the document D fed in the reverse direction RD may reach the pickup area. The certain period of time may be identified considering a reverse feed rate of the document D fed by, for example, the retard roller 30 and a distance from the pickup sensor S1 to the nip SN.

The reverse feeding operation may be performed by rotating the feed roller 20 and the retard roller 30 in the reverse direction RD. The processor 1000 may turn on the separation clutch 39 and the ADF clutch 22. In the state shown in FIG. 19, the processor 1000 may drive the separation motor 35 to rotate the retard roller 30 in the reverse direction RD, and reversely rotate the pickup motor 16 to rotate the feed roller 20 in the reverse direction RD. As described above, the rotational force in the reverse direction RD of the rotation shaft 21 rotated by the pickup motor 16 may be transmitted to the feed roller 20 by the second one-way bearing 26. The pickup roller 10 may be rotated by being driven by the feed roller 20. The documents D1 and D2 may be fed sequentially or together in the reverse direction RD. As shown in FIG. 20, based on the front ends of the documents D1 and D2 reaching a pickup area, the processor 1000 may turn off the separation clutch 39 and the ADF clutch 22 and stop the separation motor 35 and the pickup motor 16.

The reverse feeding operation may be performed by rotating the feed roller 20 in the reverse direction RD and allowing the retard roller 30 to be driven by the feed roller 20. The processor 1000 may turn off the separation clutch 39 and turn on the ADF clutch 22. The processor 1000 may reversely rotate the pickup motor 16. As described above, the rotational force in the reverse direction RD of the rotation shaft 21 rotated by the pickup motor 16 may be transmitted to the feed roller 20 by the second one-way bearing 26, and the feed roller 20 may be rotated in the reverse direction RD. The pickup roller 10 may be rotated by being driven by the feed roller 20. The documents D1 and D2 may be fed sequentially or together in the reverse direction RD. As shown in FIG. 20, based on the front ends of the documents D1 and D2 reaching the pickup area, the processor 1000 may turn off the ADF clutch 22 and stop the pickup motor 16.

The processor 1000 may perform a re-feeding operation. The re-feeding operation may include moving the tray 80 to the first position, feeding the erroneous document D back to the document feeding path DP using the document feeding member 200, and feeding the same to the reading member 60. Based on the pickup roller 10 being moved to the fourth position in the reverse feeding operation, the re-feeding operation may include moving the pickup roller 10 back to the third position.

The processor 1000 may reversely rotate the tray motor 82. The lifting arm 84 may push the tray 80 to move the tray 80 to the first position. As shown in FIG. 4, based on the tray 80 reaching the first position, the processor 1000 may stop the tray motor 82. The processor 1000 may turn on the pickup clutch 18 and rotate the pickup motor 16 to move the pickup roller 10 to the third position. As shown in FIG. 7, based on the pickup roller 10 reaching the third position, the processor 1000 may turn off the pickup clutch 18. The processor 1000 may turn on the ADF clutch 22 and the separation clutch 39, and rotate the pickup motor 16 and the separation motor 35 to rotate the feed roller 20 and the retard roller 30 in the forward direction FD and the reverse direction RD, respectively. The pickup roller 10 may be rotated in the forward direction FD together with the feed roller 20. As shown in FIGS. 4 and 7, the document D1 may be fed again through the nip SN to the document feeding path DP.

Based on a document feed error not being detected, as shown in FIG. 17, the processor 1000 may perform the reading operation S120 on the document D1. Based on a document feed error being detected, the processor 1000 may perform a retry operation as described above. The retry operation may be performed multiple times. In operation S165, based on a document feed error being detected even after the retry operation is performed a reference number of times, for example, 3 times, the processor 1000 may output an error message through the user interface device 1002 in operation S170.

Figure 21:
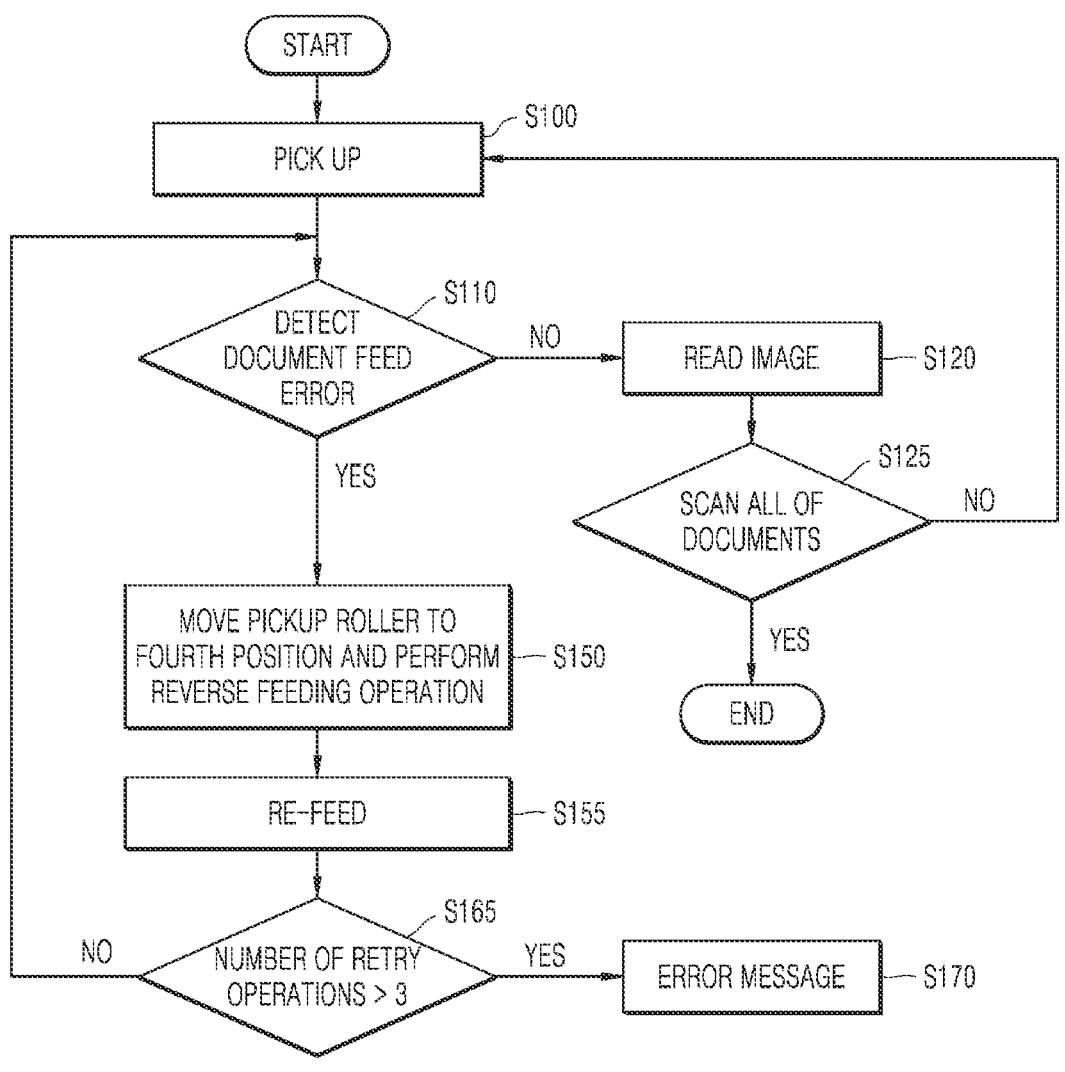
FIG. 21 is a flowchart illustrating a scanning method according to an example.

FIG. 21 is a flowchart illustrating a scanning method according to an example. The example of the scanning method illustrated in FIG. 21 is different from the example of the scanning method shown in FIG. 14 in that the reverse feeding operation S150 and the re-feeding operation S155 are different from the reverse feeding operation S130 and the re-feeding operation S160. Hereinafter, the differences will be described.

After performing the pick-up operation S100, based on a document feed error being detected, a document feeding retry operation may be performed. The document feeding retry operation includes operation S150 of moving the pickup roller 10 between the third position and the fourth position and performing a reverse feeding operation of feeding the erroneous document D in the reverse direction RD, and operation S155 of performing a re-feeding operation of moving the pickup roller 10 to the third position after performing the reverse feeding operation and feeding the erroneous document D back to the document feeding path DP. Because the pickup roller 10 may be moved in a direction away from the tray 80 and may be located in the fourth position, a distance between the tray 80 and the pickup roller 10 may be increased, and thus, pushing of the documents D loaded on the tray 80 by the document D1 being fed in the reverse direction RD and the disruption of front end alignment due to this may be prevented.

Figure 22:
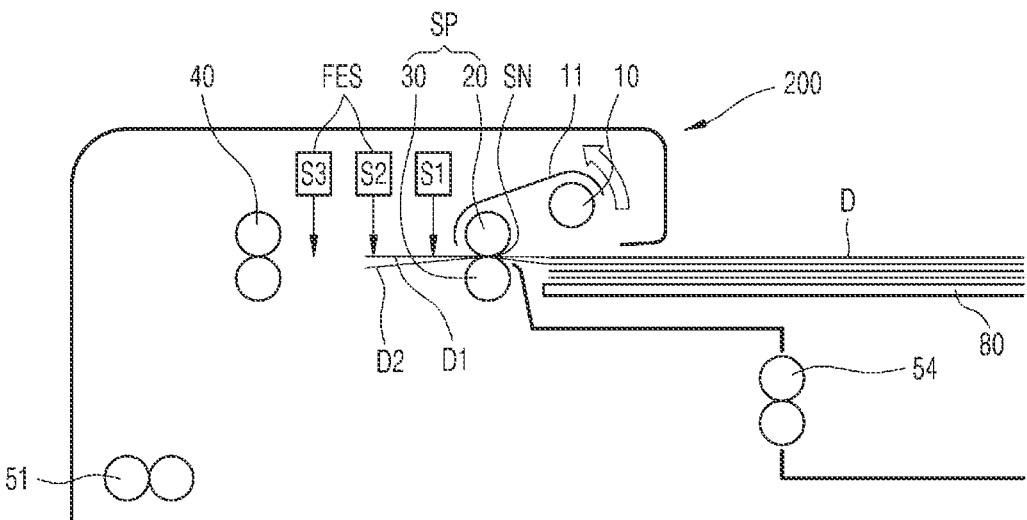
FIG. 22 is a view illustrating a state in which a pickup roller is located in a fourth position according to an example.

Hereinafter, examples of operations S150 and S155 will be sequentially described with reference to FIGS. 1 to 21 and FIG. 22 showing a state in which the pickup roller 10 is located in the fourth position according to an example. Based on a document feed error, for example, based on double feed being detected by the double-feed detection sensor S2 as shown in FIG. 18, the processor 1000 may stop the document feed. The processor 1000 may stop the pickup motor 16 and the separation motor 35. The processor 1000 may move the pickup roller 10 between the third position and the fourth position. The processor 1000 may turn on the pickup clutch 18 and rotate the pickup motor 16 forward. While the pickup cam 15 is rotated, the pickup lever 13 may be rotated to press the interference projection 11a of the pickup housing 11. The pickup housing 11 may be rotated in a direction in which the pickup roller 10 moves away from the tray 80. As shown in FIG. 22, based on the pickup roller 10 reaching the fourth position, the processor 1000 may turn off the pickup clutch 18 and stop the pickup motor 16. The pickup roller 10 may be apart from the document D on the tray 80. The processor 1000 may perform a reverse feeding operation in which the erroneous document D, that is, doubly-fed documents D1 and D2 are fed in the reverse direction RD using the document feeding member 200 to locate the front ends of the documents D1 and D2 in a pickup area, for example, between the nip SN and the pickup roller 10 as shown in FIGS. 6 and 20. As described above, the reverse feeding operation may be performed by rotating the retard roller 30 in the reverse direction RD and allowing the feed roller 20 to be driven by the retard roller 30, rotating the feed roller 20 and the retard roller 30 in the reverse direction RD, or rotating the feed roller 20 in the reverse direction RD and allowing the retard roller 30 to be driven by the feed roller 20. Based on the front ends of the erroneous documents D1 and D2 reaching the pickup area, the processor 1000 may turn off the ADF clutch 22 and stop the pickup motor 16.

The processor 1000 may perform a re-feeding operation. The re-feeding operation may include moving the pickup roller 10 to the third position, and feeding the erroneous document D back to the document feeding path DP using the document feeding member 200 and feeding the same to the reading member 60. The processor 1000 may turn on the pickup clutch 18 and rotate the pickup motor 16 to move the pickup roller 10 to the third position. As shown in FIG. 7, based on the pickup roller 10 reaching the third position, the processor 1000 may turn off the pickup clutch 18. The processor 1000 may turn on the ADF clutch 22 and the separation clutch 39, and rotate the pickup motor 16 and the separation motor 35 to rotate the feed roller 20 and the retard roller 30 in the forward direction FD and the reverse direction RD, respectively. The pickup roller 10 may be rotated in the forward direction FD together with the feed roller 20. The document D1 may be fed again through the nip SN to the document feeding path DP. Based on a document feed error not being detected, the processor 1000 may perform reading operation S120 on the document D1. Based on a document feed error being detected, the processor 1000 may perform a retry operation as described above. The retry operation may be performed multiple times. In operation S165, based on a document feed error being detected even after the retry operation is performed a reference number of times, for example, 3 times, the processor 1000 may output an error message through the user interface device 1002 in operation S170.

The memory 1001 may store machine readable instructions or a program for performing the above-described operations. For example, the memory 1001 may store instructions for a scanning method of the scanner 1 that controls the scanner 1 to perform an operation of locating the tray 80 at the first position and driving the document feeding member 200 to feed the document D to the document feeding path DP, an operation of moving the tray 80 to the second position based on a document feed error being detected, a reverse feeding operation of positioning a front end of the document D in a pickup area, that is, between the nip SN and the pickup roller 10 by feeding a picked up or erroneous document D in the reverse direction using the document feeding member 200, and an operation of returning the tray 80 to the first position and driving the document feeding member 200 to re-feed the document D to the reading member 60 along the document feeding path DP. The memory 1001 may further store instructions for the scanning method of the scanner 1 that controls the scanner 1 to perform an operation of moving the pickup roller 10 to the fourth position before or during the reverse feeding operation. The memory 1001 may further store instructions for the scanning method of the scanner 1 that controls the scanner 1 to perform an operation of outputting an error message through the user interface 1002 based on a document feed error being detected even after performing the reverse feeding operation and the re-feeding operation reference number of times.

The memory 1001 may include at least one type of storage medium from among memory of a flash memory type, a hard disk type, a multimedia card micro type or a card type (e.g., SD or XD memory), random access memory (RAM), static random access memory (SRAM), read-only memory (ROM), electrically erasable programmable ROM (EE-PROM), programmable ROM (PROM), magnetic memory, a magnetic disk, or an optical disk.

The above-described example scanning method of the scanner 1 may be implemented in the form of a non-transitory computer-readable storage medium storing instructions or data executable by a computer or a processor. The examples may be written as computer programs and may be implemented in general-use digital computers that execute programs using the non-transitory computer-readable storage medium. The computer-readable storage medium may include ROM, RAM, flash memory, CD-ROMs, CD-Rs, CD+Rs, CD-DVD-Rs, DVD-Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing machine readable instructions, associated data, data files, and data structures, and providing the machine readable instructions, associated data, data files, and data structures to a processor or a computer such that the processor or computer may execute the instructions.

Figure 23:
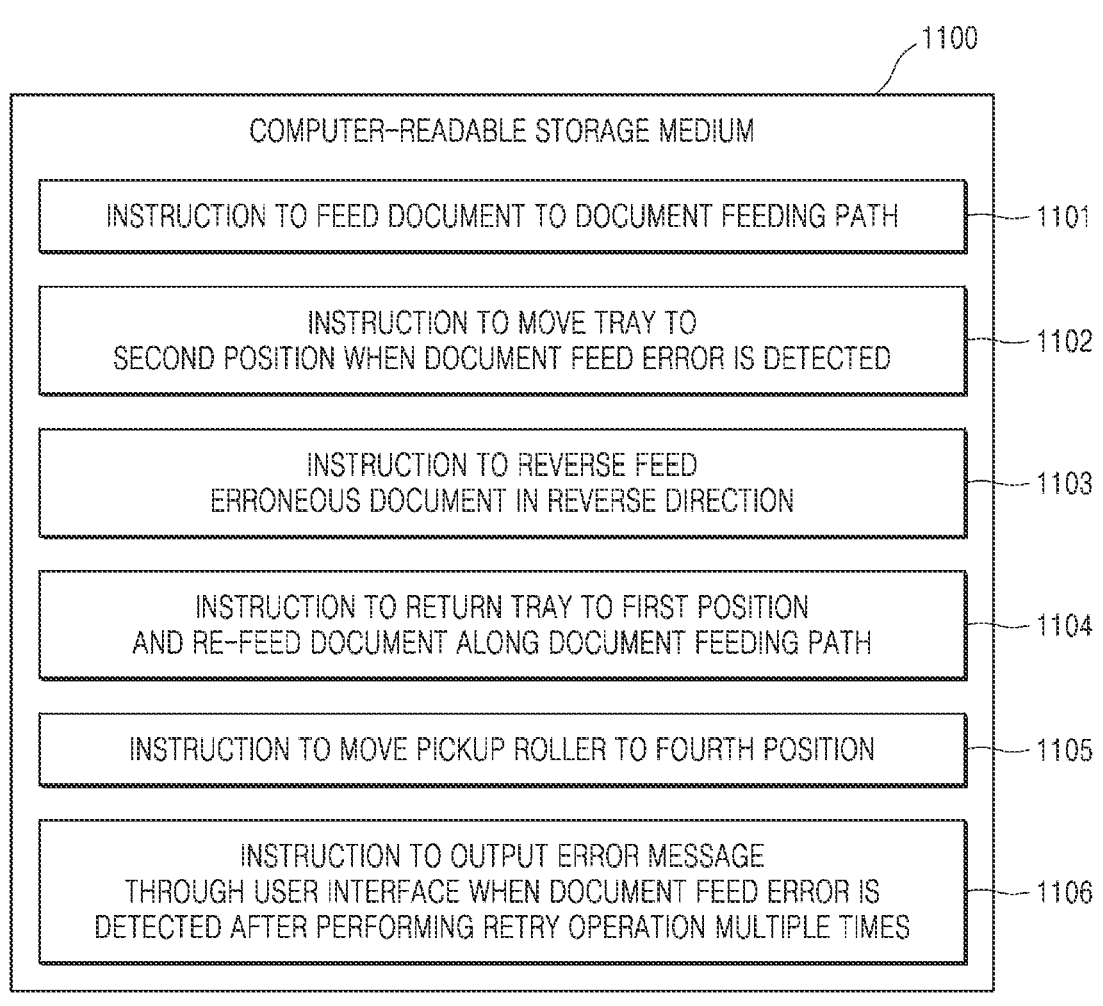
FIG. 23 is a view for explaining instructions stored in a non-transitory computer-readable storage medium according to an example.

FIG. 23 is a view for explaining instructions stored in a non-transitory computer-readable storage medium according to an example. A non-transitory computer-readable storage medium 1100 illustrated in FIG. 23 may store instructions for an example scanning method of the scanner 1 for controlling a scanning process to perform a retry operation according to whether a document feed error is detected. For example, the non-transitory computer-readable storage medium 1100 may store instructions 1101, 1102, 1103, and 1104 for a scanning method of the scanner 1 that controls the scanner 1 to perform an operation of locating the tray 80 at the first position and driving the document feeding member 200 to feed the document D to the document feeding path DP, an operation of moving the tray 80 to the second position based on a document feed error being detected, a reverse feeding operation of positioning a front end of the document D in a pickup area, that is, between the nip SN and the pickup roller 10 by feeding a picked up or erroneous document D in the reverse direction using the document feeding member 200, and an operation of returning the tray 80 to the first position and driving the document feeding member 200 to re-feed the document D to the reading member 60 along the document feeding path DP. The non-transitory computer-readable storage medium 1100 may further store an instruction 1105 for the example scanning method of the scanner 1 to control the scanner 1 to perform an operation of moving the pickup roller 10 to the fourth position before or during the reverse feeding operation. The non-transitory computer-readable storage medium 1100 may further store an instruction 1106 for an example scanning method of the scanner 1 for controlling the scanner 1 to perform an operation of outputting an error message through the user interface 1002 based on a document feed error being detected even after performing the retry operation multiple times.

Figure 24:
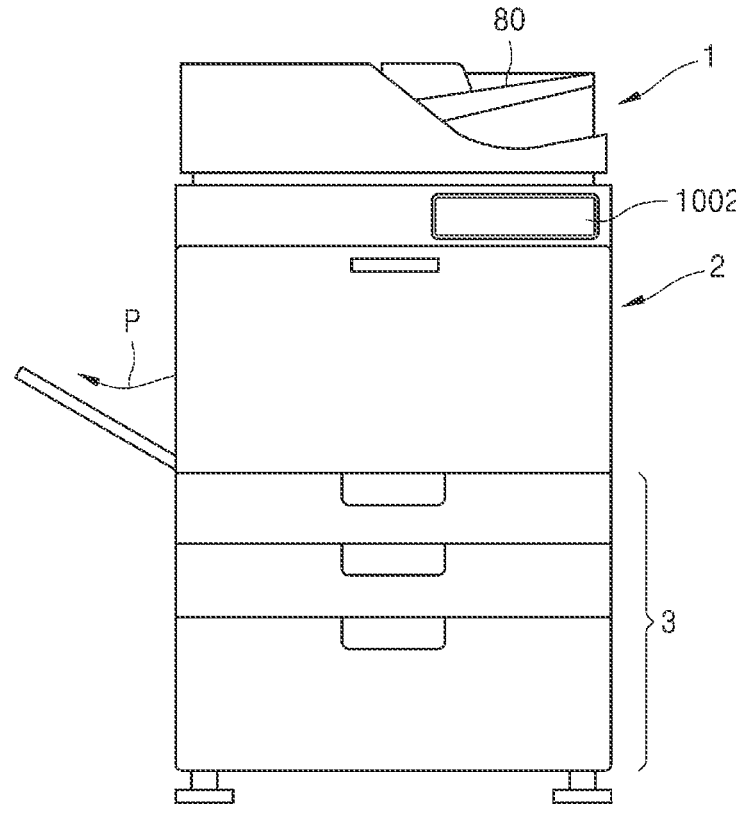
FIG. 24 is a diagram of an image forming apparatus according to an example.

FIG. 24 is a diagram of an image forming apparatus according to an example. Referring to FIG. 24, the image forming apparatus may include the scanner 1 and a printing unit 2. The printing unit 2 is to print an image on a print medium P. The printing medium P may be supplied from a feeder 3 to the printing unit 2. The printing unit 2 may print an image on a print medium P using any one of various printing methods, such as an electrophotographic method, an inkjet method, a thermal transfer method, a thermal subli-mation method, or the like. For example, the image forming apparatus may print a color image on the print medium P using the electrophotographic method. The scanner 1 is the same as shown in FIGS. 1 to 13.

Although examples have been described with reference to the accompanying drawings, various changes and modifi-cations may be made therein. For example, the relevant results may be achieved even based on the described tech-nologies being performed in a different order than the described methods, and/or even based on the described elements such as systems, structures, devices, and circuits being coupled or combined in a different form than the described methods or are replaced or substituted by other elements or equivalents. Therefore, the scope of the present disclosure should be defined not by the described examples alone, but by the appended claims and the equivalents thereof.

It should be understood that examples described herein should be considered in a descriptive sense and not for purposes of limitation. Descriptions of features or aspects within each example should typically be considered as available for other similar features or aspects in other examples. While various examples have been described with reference to the figures, it will be understood that various changes in form and details may be made therein without departing from the spirit and scope as defined by the following claims.

What is claimed is:

1. A scanner comprising:

a tray to receive a document and to ascend/descend between a first position to feed the document and a second position deviating from the first position;

a reading member to read an image from the document;

a document feeding member to feed the document to the reading member;

a document feed error detection sensor to detect a document feed error caused by the document feeding member; and a processor, wherein the processor is to:

based on detecting a document feed error by the document feed error detection sensor, move the tray between the first position to the second position and control the document feeding member to perform a reverse feeding operation of feeding an erroneous document toward the tray, and, based on performing the reverse feeding operation, move the tray between the second position and the first position and control the document feeding member to perform a re-feeding operation of feeding the erroneous document to the reading member.

2. The scanner of claim 1, wherein the document feeding member comprises a pickup roller to ascend/descend between a third position to pick up a document, and a fourth position deviating from the third position, and wherein the processor is to control the pickup roller to move to the fourth position before or during the reverse feeding operation.

3. The scanner of claim 1, wherein the document feed error detection sensor comprises a double-feed detection sensor to detect double feeding of documents, and wherein, based on detecting double feeding of documents by the double-feed detection sensor, the processor is to identify that there is a document feed error.

4. The scanner of claim 1, further comprising an alignment roller to correct skew of the document, wherein the document feed error detection sensor comprises an alignment sensor located on an upstream side of the alignment roller to detect a document, and wherein, based on a document not being detected by the alignment sensor within a certain period of time after document feeding is started, the processor is to identify that there is a document feed error.

5. The scanner of claim 1, wherein, based on the document feed error not being resolved after performing the reverse feeding operation and the re-feeding operation a reference number of times, the processor is to output an error message through a user interface device.

6. The scanner of claim 1, wherein the document feed error detection sensor is to detect the document feed error between the document feeding member and the reading member.

7. The scanner of claim 1, wherein the document feeding member comprises a feed roller and a retard roller to engage with each other to form a nip and separate and feed picked-up documents one-by-one, and wherein the document feed error detection sensor comprises a double-feed detection sensor located on a downstream side of the nip to detect whether documents are being doubly-fed.

8. The scanner of claim 1, wherein the document feeding member comprises a feed roller and a retard roller to engage with each other to form a nip and separate and feed picked-up documents one-by-one, wherein the scanner further comprises:

an alignment roller located on a downstream side of the nip to correct skew of a document; and a pickup sensor located on the downstream side of the nip to detect a document, wherein the document feed error detection sensor comprises an alignment sensor located between the alignment roller and the pickup sensor to detect a document, and wherein, based on a document not being detected by the alignment sensor within a certain period of time after a document is detected by the pickup sensor, the processor is to identify that there is a document feed error.

9. A scanner comprising:

a tray to receive a document and to ascend/descend between a first position to feed the document and a second position deviating from the first position;

a reading member to read an image from the document;

a document feeding member to pick up a document, and feed the document to the reading member comprising a pickup roller to ascend/descend between a third position to pick up a document, and a fourth position deviating from the third position;

a document feed error detection sensor to detect a document feed error caused by the document feeding member; and a processor, wherein the processor is to:

based on detecting a document feed error by the document feed error detection sensor, move the tray between the first position to the second position and control the document feeding member to perform a reverse feeding operation of feeding an erroneous document toward the tray; and control the document feeding member to perform a re-feeding operation of feeding the erroneous document to the reading member.

10. The scanner of claim 9, wherein the processor is to control the pickup roller to move to the fourth position before or during the reverse feeding operation.

11. The scanner of claim 9, wherein the document feed error detection sensor comprises a double-feed detection sensor to detect double feeding of documents, and wherein, based on detecting double feeding of documents by the double-feed detection sensor, the processor is to identify that there is a document feed error.

12. The scanner of claim 9, further comprising an alignment roller to correct skew of the document, wherein the document feed error detection sensor comprises an alignment sensor located on an upstream side of the alignment roller to detect a document, and wherein, based on a document not being detected by the alignment sensor within a certain period of time after document feeding is started, the processor is to identify that there is a document feed error.

13. The scanner of claim 9, wherein, based on the document feed error not being resolved after performing the reverse feeding operation and the re-feeding operation a reference number of times, the processor is to output an error message through a user interface device.

14. The scanner of claim 9, wherein the document feed error detection sensor is to detect the document feed error between the document feeding member and the reading member.

15. An apparatus, comprising:

a tray to receive a document and to ascend/descend between a first position to feed the document and a second position deviating from the first position;

a reading member to read an image from the document;

a document feeding member to pick up a document, and feed the document to the reading member comprising a pickup roller to ascend/descend between a third position to pick up a document, and a fourth position deviating from the third position;

a document feed error detection sensor to detect a document feed error caused by the document feeding member; and a processor, wherein the processor is to:

based on detecting a document feed error by the document feed error detection sensor, move the tray between the first position to the second position and control the document feeding member to perform a reverse feeding operation of feeding an erroneous document toward the tray; and control the document feeding member to perform a re-feeding operation of feeding the erroneous document to the reading member, wherein the re-feeding operation includes moving the tray from the second position to the first position.

16. The apparatus of claim 15, wherein the processor is to control the pickup roller to move to the fourth position before or during the reverse feeding operation.

17. The apparatus of claim 15, wherein the document feed error detection sensor comprises a double-feed detection sensor to detect double feeding of documents, and wherein, based on detecting double feeding of documents by the double-feed detection sensor, the processor is to identify that there is a document feed error.

18. The apparatus of claim 15, further comprising an alignment roller to correct skew of the document, wherein the document feed error detection sensor comprises an alignment sensor located on an upstream side of the alignment roller to detect a document, and wherein, based on a document not being detected by the alignment sensor within a certain period of time after document feeding is started, the processor is to identify that there is a document feed error.

19. The apparatus of claim 15, wherein, based on the document feed error not being resolved after performing the reverse feeding operation and the re-feeding operation a reference number of times, the processor is to output an error message through a user interface device.

20. The apparatus of claim 15, wherein the document feed error detection sensor is to detect the document feed error between the document feeding member and the reading member.

\* \* \* \* \*